United States Patent
Merlin et al.

(10) Patent No.: US 9,083,408 B2
(45) Date of Patent: Jul. 14, 2015

(54) IMPLICIT AND EXPLICIT CHANNEL SOUNDING FOR BEAMFORMING

(75) Inventors: Simone Merlin, San Diego, CA (US); Didier Johannes Richard Van Nee, De Meern (NL); Albert Van Zelst, Woerden (NL)

(73) Assignee: QUALCOMM Incorporated, San Diego, CA (US)

(*) Notice: Subject to any disclaimer, the term of this patent is extended or adjusted under 35 U.S.C. 154(b) by 381 days.

(21) Appl. No.: 13/220,208

(22) Filed: Aug. 29, 2011

(65) Prior Publication Data
US 2012/0051287 A1 Mar. 1, 2012

Related U.S. Application Data

(60) Provisional application No. 61/378,646, filed on Aug. 31, 2010.

(51) Int. Cl.
*H04B 1/10* (2006.01)
*H04B 7/06* (2006.01)
(Continued)

(52) U.S. Cl.
CPC ............ *H04B 7/0617* (2013.01); *H04B 7/0619* (2013.01); *H04L 25/022* (2013.01);
(Continued)

(58) Field of Classification Search
CPC .. H04B 7/0456; H04B 7/0617; H04B 7/0619; H04L 25/03898; H04L 25/0391
See application file for complete search history.

(56) References Cited

U.S. PATENT DOCUMENTS 6,470,047 B1 * 10/2002 Kleinerman et al. ......... 375/232
6,940,917 B2 9/2005 Menon et al.
(Continued)

FOREIGN PATENT DOCUMENTS

JP 2002033780 A 1/2002
JP 2004289775 A 10/2004
(Continued)

OTHER PUBLICATIONS

Abu-Alhiga, R. et al., "Interference-Weighted Channel Sounding for Cellular SDMA-TDD Systems," IEEE 69th Vehicular Technology Conference, 2009. pp. 1-5, Apr. 26-29, 2009, (See section II, p. 2-3).
(Continued)

*Primary Examiner* — Kevin Kim
(74) *Attorney, Agent, or Firm* — Austin Rapp & Hardman

(57) ABSTRACT

A communication device for transmitting beamformed signals using implicit channel sounding is described. The communication device includes a processor and instructions stored in memory. The communication device receives one or more sounding signals and computes a channel estimate based on the one or more sounding signals. Frequency offset compensation is applied to the channel estimate by the communication device. The communication device also computes a precoding matrix based on the channel estimate and transmits a beamformed signal using the precoding matrix. Another communication device for receiving beamformed signals using explicit channel sounding is also described. The communication device includes a processor and instructions stored in memory. The communication device receives one or more sounding signals, computes a channel estimate based on the one or more sounding signals and applies amplitude compensation to the channel estimate. The communication device also sends estimated channel data and receives a beamformed signal.

49 Claims, 10 Drawing Sheets

(51) Int. Cl.
*H04L 25/02* (2006.01)
*H04L 25/03* (2006.01)
*H04L 27/26* (2006.01)

(52) U.S. Cl.
CPC ........ *H04L25/0204* (2013.01); *H04L 25/0228* (2013.01); *H04L 25/03159* (2013.01); *H04L 25/03343* (2013.01); *H04L 27/2657* (2013.01); *H04L 27/2675* (2013.01); *H04L 2025/03783* (2013.01); *H04L 2025/03808* (2013.01)

(56) References Cited

U.S. PATENT DOCUMENTS

| | | | |
|---|---|---|---|
| 7,346,135 B1 * | 3/2008 | Narasimhan | 375/346 |
| 7,627,286 B2 | 12/2009 | Webster et al. | |
| 7,860,174 B2 * | 12/2010 | Hammerschmidt et al. | 375/260 |
| 8,144,824 B2 | 3/2012 | Vrcelj et al. | |
| 8,498,363 B2 | 7/2013 | Van Nee et al. | |
| 2003/0016646 A1 | 1/2003 | Miya | |
| 2003/0128656 A1 * | 7/2003 | Scarpa | 370/203 |
| 2004/0081205 A1 * | 4/2004 | Coulson | 370/503 |
| 2005/0014464 A1 | 1/2005 | Larsson | |
| 2005/0129137 A1 | 6/2005 | Yamada et al. | |
| 2007/0160162 A1 | 7/2007 | Kim et al. | |
| 2009/0046582 A1 * | 2/2009 | Sarkar et al. | 370/230.1 |
| 2010/0008406 A1 | 1/2010 | Sawai et al. | |
| 2010/0080311 A1 | 4/2010 | Moffatt et al. | |
| 2010/0093282 A1 | 4/2010 | Martikkala et al. | |
| 2010/0182979 A1 * | 7/2010 | Malladi et al. | 370/336 |
| 2010/0208781 A1 | 8/2010 | Wentink et al. | |
| 2010/0232352 A1 * | 9/2010 | Merlin et al. | 370/328 |
| 2011/0007685 A1 | 1/2011 | Ma et al. | |
| 2011/0051636 A1 | 3/2011 | Van Nee et al. | |
| 2012/0263210 A1 * | 10/2012 | Panah et al. | 375/211 |

FOREIGN PATENT DOCUMENTS

| | | |
|---|---|---|
| JP | 2008301418 A | 12/2008 |
| WO | 2004021605 A1 | 3/2004 |
| WO | 2006099242 A1 | 9/2006 |
| WO | WO2008002972 | 1/2008 |
| WO | 2009099913 A1 | 8/2009 |
| WO | WO-2011103366 | 8/2011 |

OTHER PUBLICATIONS

International Search Report and Written Opinion—PCT/US2011/049752—ISA/EPO—Oct. 25, 2011.

Paul T K, et al., "Wireless LAN Comes of Age: Understanding the IEEE 802.11n Amendment" IEEE Circuits and Systems Magazine, IEEE Service Center, New York, NY, US, vol. 8, No. 1, Jan. 1, 2008, pp. 28-54, XP011205239 ISSN: 1531-636X.

Kocan, E., et al., "Channel Estimation Technique with Frequency Offset Correction for OFDM Space-Time Diversity System", Telecommunications in Modern Satellite, Cable and Broadcasting Services, 2005. 7th International Conference on NIS, Serbia and Montenegro Sep. 28-30, 2005, Piscataway, NJ, USA, IEEE, vol. 1, Sep. 28, 2005, pp. 93-96, XP010874583, DOI: 10.1109/TELSKS.2005.1572070 ISBN: 978-0-7803-9164-2.

Qinghua Li., et al., "Advancement of MIMO technology in WiMax; from IEEE 802.16d/e/j to 802.16m"; Communications Magazine, IEEE (vol. 47, Issue: 6), Jun. 2009, pp. 100-107.

* cited by examiner

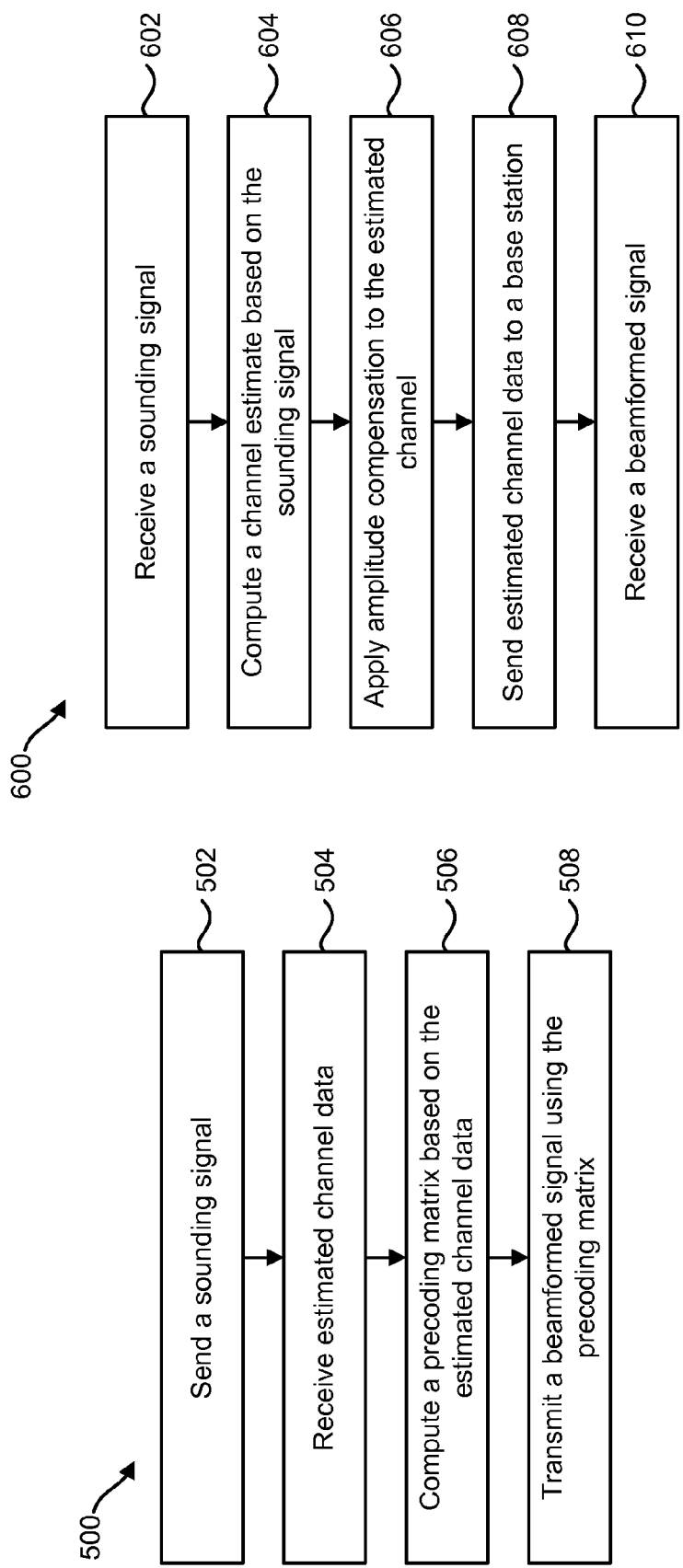

IMPLICIT AND EXPLICIT CHANNEL SOUNDING FOR BEAMFORMING

CROSS-REFERENCE TO RELATED APPLICATIONS

The present application claims priority to U.S. Provisional Patent Application Ser. No. 61/378,646, entitled "IMPLICIT AND EXPLICIT CHANNEL SOUNDING FOR BEAMFORMING", filed Aug. 31, 2010, assigned to the assignee hereof and expressly incorporated herein by reference.

TECHNICAL FIELD

The present disclosure relates generally to communication systems. More specifically, the present disclosure relates to implicit and explicit channel sounding for beamforming.

BACKGROUND

Wireless communication systems are widely deployed to provide various types of communication content such as data, voice, video and so on. These systems may be multiple-access systems capable of supporting simultaneous communication of multiple wireless communication devices with one or more base stations.

Use of these base stations has dramatically increased over the past few years. Base stations often provide access to a network, such as a Local Area Network (LAN) or the Internet, for example. Users of wireless communication devices often connect to networks using such base stations. Users may desire to wirelessly connect multiple wireless communication devices to a single base station. Furthermore, users may also desire faster and more reliable throughput via wireless communication devices. Thus, increases in throughput and reliability on base stations are being sought.

When multiple wireless communication devices attempt to connect to a single base station, however, particular difficulties may arise. For example, the signals transmitted to or received from multiple wireless communication devices may interfere, causing degraded system performance. This may particularly occur when the wireless communication devices are not adequately synchronized with the base station. For this reason, improved systems and methods for reducing interference between wireless communication devices may be beneficial.

SUMMARY

A communication device for transmitting beamformed signals using implicit channel sounding is disclosed. The communication device includes a processor and instructions stored in memory. The communication device receives one or more sounding signals. The communication device also computes a channel estimate based on the one or more sounding signals. The communication device further applies frequency offset compensation to the channel estimate. The communication device also computes a precoding matrix based on the channel estimate. Furthermore, the communication device transmits a beamformed signal using the precoding matrix. The beamformed signal may be a Space Division Multiple Access (SDMA) signal. The communication device may also include one or more antennas.

The communication device may also apply amplitude compensation to the channel estimate. The communication device may be a base station, an access point, a wireless communication device or an access terminal. The communication device may utilize Orthogonal Frequency Division Multiplexing (OFDM).

The one or more sounding signals may be at least part of one or more training packets. The one or more sounding signals may be received from one or more other communication devices. The one or more other communication devices may be one or more wireless communication devices, access terminals, base stations or access points.

Applying frequency offset compensation to the channel estimate may include taking an Inverse Fast Fourier Transform (IFFT) of the channel estimate to produce a time-domain channel estimate and multiplying the time-domain channel estimate by a sample-shifted exponential function to produce a frequency offset compensated time-domain channel estimate. Applying frequency offset compensation to the channel estimate may also include taking a Fast Fourier Transform (FFT) of the frequency offset compensated time-domain channel estimate to produce a frequency offset compensated frequency domain channel estimate. Applying frequency offset compensation to the channel estimate may additionally include applying a window function to the time-domain channel estimate.

A communication device for receiving beamformed signals using explicit channel sounding is also disclosed. The communication device includes a processor and instructions stored in memory. The communication device receives one or more sounding signals. The communication device further computes a channel estimate based on the one or more sounding signals. The communication device also applies amplitude compensation to the channel estimate. Additionally, the communication device sends estimated channel data and receives a beamformed signal. The communication device may also include one or more antennas. The communication device may utilize Orthogonal Frequency Division Multiplexing (OFDM). The one or more sounding signals may be at least part of one or more training packets. The beamformed signal may be a Space Division Multiple Access (SDMA) signal. The communication device may be a wireless communication device, an access terminal, a base station or an access point.

The one or more training packets may be received from another communication device. The other communication device may be a wireless communication device, an access terminal, a base station or an access point. The estimated channel data may be sent to another communication device. The other communication device may use the estimated channel data to compute a precoding matrix and transmit a beamformed signal.

A method for transmitting beamformed signals from a communication device using implicit channel sounding is also disclosed. The method includes receiving, by a communication device, one or more sounding signals. The method also includes computing a channel estimate based on the one or more sounding signals. The method further includes applying, by the communication device, frequency offset compensation to the channel estimate. The method also includes computing a precoding matrix based on the channel estimate. Furthermore, the method includes transmitting a beamformed signal using the precoding matrix.

A method for receiving beamformed signals using explicit channel sounding is also disclosed. The method includes receiving, by a communication device, one or more sounding signals. The method also includes computing a channel estimate based on the one or more sounding signals. The method further includes applying amplitude compensation to the channel estimate. The method also includes sending estimated channel data. The method additionally includes receiving a beamformed signal.

A computer-program product for transmitting beamformed signals using implicit channel sounding is also disclosed. The computer-program product includes a non-transitory tangible computer-readable medium with instructions. The instructions include code for receiving one or more sounding signals. The instructions also include code for computing a channel estimate based on the one or more sounding signals. Additionally, the instructions include code for applying frequency offset compensation to the channel estimate. Code for computing a precoding matrix based on the channel estimate is included in the instructions. The instructions also include code for transmitting a beamformed signal using the precoding matrix.

A computer-program product for receiving beamformed signals using explicit channel sounding is also disclosed. The computer-program product includes a non-transitory tangible computer-readable medium with instructions. The instructions include code for receiving one or more sounding signals. The instructions also include code for computing a channel estimate based on the one or more sounding signals. Additionally, the instructions include code for applying amplitude compensation to the channel estimate. The instructions also include code for sending estimated channel data. The instructions further include code for receiving a beamformed signal.

An apparatus for transmitting beamformed signals using implicit channel sounding is also disclosed. The apparatus includes means for causing a communication device to receive one or more sounding signals. The apparatus also includes means for causing the communication device to compute a channel estimate based on the one or more sounding signals. Additionally, the apparatus includes means for causing the communication device to apply frequency offset compensation to the channel estimate. The apparatus further includes means for causing the communication device to compute a precoding matrix based on the channel estimate. The apparatus also includes means for causing the communication device to transmit a beamformed signal using the precoding matrix.

An apparatus for receiving beamformed signals using explicit channel sounding is also disclosed. The apparatus includes means for causing a communication device to receive one or more sounding signals. The apparatus also includes means for causing the communication device to compute a channel estimate based on the one or more sounding signals. The apparatus further includes means for causing the communication device to apply amplitude compensation to the channel estimate. Additionally, the apparatus includes means for causing the communication device to send estimated channel data. The apparatus also includes means for causing the communication device to receive a beamformed signal.

BRIEF DESCRIPTION OF THE DRAWINGS

FIG. 5 is a flow diagram illustrating one configuration of a method for transmitting beamformed signals using explicit channel sounding;

FIG. 6 is a flow diagram illustrating one configuration of a method for receiving beamformed signals using explicit channel sounding;

DETAILED DESCRIPTION

Figure 1:
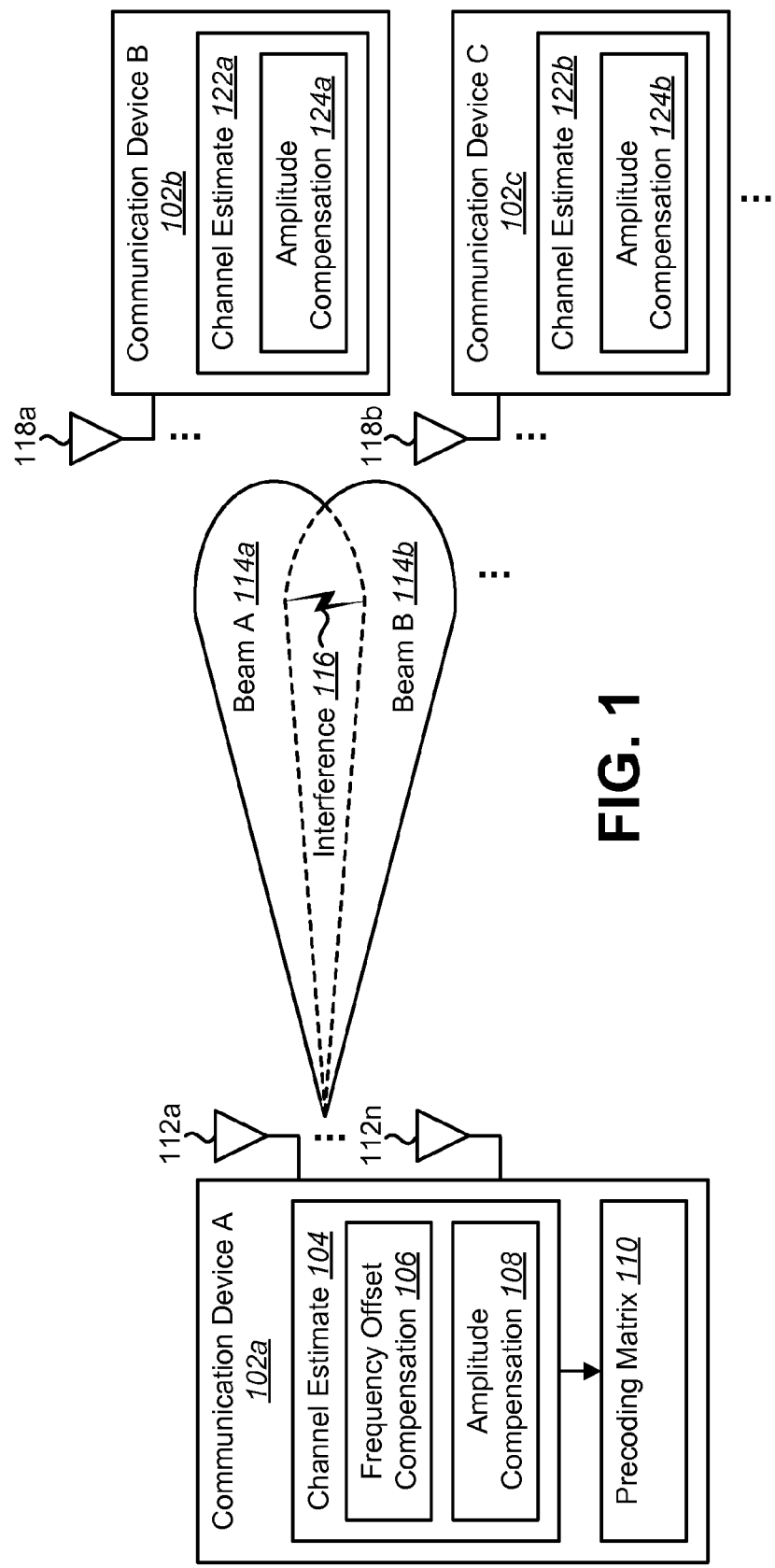
FIG. 1 is a block diagram illustrating one configuration of several communication devices in which systems and methods for implicit and explicit channel sounding for beamforming may be implemented.

As used herein, the term "base station" generally denotes a communication device that is capable of providing access to a communications network. Examples of communications networks include, but are not limited to, a telephone network (e.g., a "land-line" network such as the Public-Switched Telephone Network (PSTN) or cellular phone network), the Internet, a Local Area Network (LAN), a Wide Area Network (WAN), a Metropolitan Area Network (MAN), etc. Examples of a base station include cellular telephone base stations or nodes, access points, wireless gateways and wireless routers. A base station (e.g., access point) may operate in accordance with certain industry standards, such as the Institute of Electrical and Electronics Engineers (IEEE) 802.11a, 802.11b, 802.11g, 802.11n, 802.11ac (e.g., Wireless Fidelity or "Wi-Fi") standards. Other examples of standards that an access point may comply with include IEEE 802.16 (e.g., Worldwide Interoperability for Microwave Access or "WiMAX"), Third Generation Partnership Project (3GPP), 3GPP Long Term Evolution (LTE) and others (e.g., where a base station may be referred to as a NodeB, evolved NodeB (eNB), etc.). While some of the systems and methods disclosed herein may be described in terms of one or more standards, this should not limit the scope of the disclosure, as the systems and methods may be applicable to many systems and/or standards.

As used herein, the term "wireless communication device" generally denotes a communication device (e.g., access terminal, client device, client station (STA) etc.) that may wirelessly connect to a base station. A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards as described above in connection with base stations. Thus, the general term "wireless communication device" may include wireless communication devices described with varying nomenclatures according to industry standards (e.g., access terminal, user equipment (UE), remote terminal, etc.).

As used herein, the terms "compensate," "compensation," "compensate for," "correct," "correction," "correct for" and other forms of "compensate" or "correct" indicate some level of compensation or correction. That is, the terms may indicate some reduction of offsets/errors or at least some action taken in an effort to reduce offsets/errors. In other words, compensating for frequency offsets or errors may only reduce the frequency offsets or errors. Thus, some amount of frequency offsets or errors may remain after "compensation" or "correction." Furthermore, a "correct" computation may mean a "more accurate" computation.

As described above, improved throughput and reliability on a base station may be beneficial. One approach to improving throughput on a base station involves using beamforming. Beamforming may be used in the context of Space Division Multiple Access (SDMA). SDMA is a technique that spatially divides transmit signals, which may allow communication resources (e.g., time and/or frequency resources) to be "reused." Beamforming may be implemented using multiple antennas by controlling the relative signal phase and amplitude at each antenna. Such control allows a transmit signal to be spatially aimed in a particular direction. SDMA may be used in a Multi-User Multiple-Input Multiple-Output (MU-MIMO context). The systems and methods disclosed herein describe techniques that may be used to compensate channel estimates in beamforming or SDMA for different frequency offsets per access terminal (e.g., "client"). More specifically, the systems and methods disclosed herein apply to beamforming using implicit and/or explicit feedback.

As described above, SDMA allows for simultaneous transmission from a base station (e.g., access point) to multiple wireless communication devices. SDMA transmission may require the computation of a "precoding matrix." The precoding matrix may be applied to the transmitted signal in order to ensure that each wireless communication device receives only the data designated for itself, without interference. Computation of the precoding matrix may use information about the channel between the base station (e.g., access point) and each wireless communication device. A base station may obtain the channel information through the use of implicit and/or explicit sounding. The systems and methods disclosed herein may provide a base station with the "correct" channel estimates to be used for computing the precoding matrix, particularly in the case where a frequency offset is present. It should be noted that a frequency offset refers to a mismatch between the carrier frequency of a transmitting communication device and the carrier frequency of a receiving communication device in a packet transmission. It should also be noted that frequency offset compensation may be relevant to the operation of particular standards. For example, frequency offset compensation may be applied to IEEE 802.11ac, IEEE 802.11n or other standard(s).

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of several communication devices 102 in which systems and methods for implicit and explicit channel sounding for beamforming may be implemented. Several communication devices 102 may communicate with each other by transmitting and/or receiving signals using one or more antennas 112, 118. For example, communication device A 102a may use multiple antennas 112a-n to transmit signals to communication devices B and C 102b-c. Communication devices B and C 102b-c may receive the transmitting signals using one or more antennas 118a-b. Examples of communication devices 102a-c include base stations and wireless communication devices. In one configuration, communication device A 102a is a base station, while communication devices B and C 102b-c are wireless communication devices. In another configuration, communication device A 102a is a wireless communication device and communication devices B and C 102b-c are base stations.

Using multiple antennas 112a-n may enable communication device A 102a to beamform or form multiple transmission beams 114 that are spatially distinct. That is, communication device A 102a may control relative phase and amplitude between signals transmitted on the antennas 112a-n in order to perform beamforming. For example, communication device A 102a may generate beam A 114a and beam B 114b. In this example, beam A 114a is spatially directed towards communication device B 102b and beam B 114b is spatially directed towards communication device C 102c.

The example shown in FIG. 1 illustrates that interference 116 may occur if the beams 114 are not formed properly. For example, the precoding matrix 110 included in communication device A 102a may be used to form multiple beams 114. If the precoding matrix 110 is not computed correctly, the beams 114 may interfere. For example, beam A 114a may include a signal intended for communication device B 102b and not communication device C 102c. However, if the precoding matrix is not computed correctly (e.g., accurately), a portion of beam A 114a may be received by communication device C 102c and/or a portion of beam B 114b may be received by communication device B 102b, causing interference 116. The precoding matrix 110 may be computed incorrectly or inaccurately, for example, if one or more channel estimates 104, 122 used to compute it 110 are inaccurate or incorrect. The systems and methods disclosed herein provide a "correct" (e.g., more accurate) computation of the precoding matrix 110, which may help avoid interference 116.

The precoding matrix 110 may be computed based on one or more channel estimates 104, 122. Implicit and/or explicit sounding may be used in order to obtain channel estimates 104, 122. In one configuration, communication device A 102a may use implicit sounding in order to obtain a channel estimate 104. For example, communication device A 102a may receive an implicit sounding signal (e.g., training packet) from each of communication device B 102b and communication device C 102c. A channel estimate 104 may be computed using the received sounding signal(s). Frequency offset compensation 106 and/or amplitude compensation 108 may be applied to the channel estimate 104 before it 104 is used to compute the precoding matrix 110. Frequency offset compensation 106 and amplitude compensation 108, 124 are described in greater detail below. The precoding matrix 110 may be used to transmit data (e.g., beamformed or SDMA signals) to communication devices B and C 102b-c.

In another configuration, explicit sounding may be used. For example, communication device A 102a may send a sounding signal (e.g., training packet) to communication device B 102b and communication device C 102c. Communication device B 102b may use the sounding signal to compute a channel estimate 122a. Communication device C 102c may also use the sounding signal to compute a channel estimate 122b. Amplitude compensation 124a-b may be applied to the channel estimates 122a-b by their respective communication devices 102b-c. Communication devices B and C 102b-c may each send a numeric representation of their respective channel estimates 122a-b (e.g., channel estimate 122 data) to communication device A 102a. Communication device A 102a may use the numeric representation of the channel estimates 122a-b to compute the precoding matrix 110, which may be used to transmit data (e.g., beamformed or SDMA signals).

Figure 2:
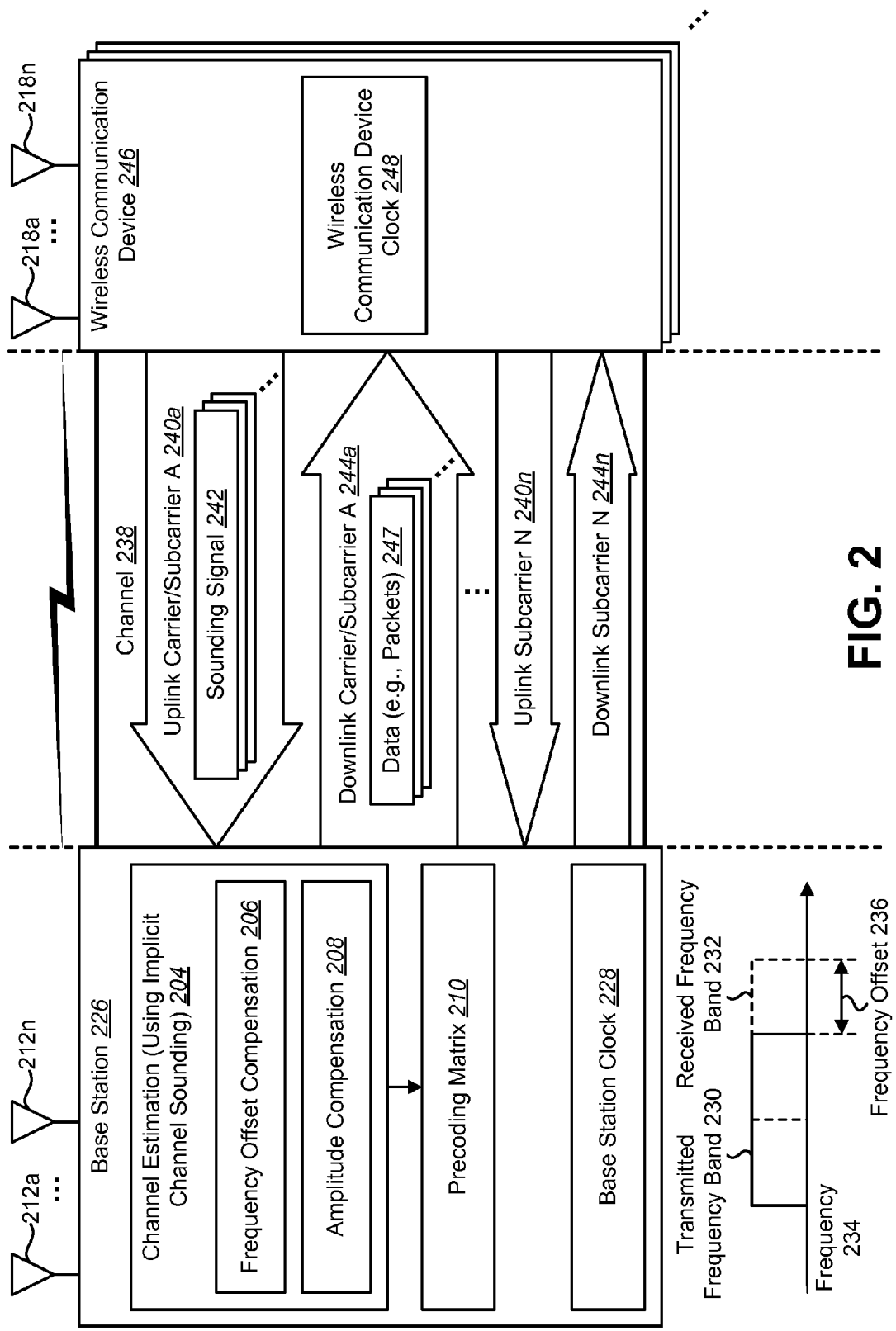
FIG. 2 is a block diagram illustrating one configuration of a base station and one or more wireless communication devices in which systems and methods for implicit channel sounding for beamforming may be implemented.

FIG. 2 is a block diagram illustrating one configuration of a base station 226 and one or more wireless communication devices 246 in which systems and methods for implicit channel sounding for beamforming may be implemented. A base station 226 may communicate with one or more wireless communication devices 246 across a channel 238. For example, the base station 226 may transmit radio frequency (RF) signals to the one or more wireless communication devices 246 using multiple antennas 212a-n. The one or more wireless communication devices 246 may each receive the transmitted signals using one or more antennas 218a-n. Conversely, the wireless communication devices 246 may transmit signals that may be received by the base station 226. Signals transmitted from the base station 226 to the wireless communication devices 246 may generally be referred to as downlink signals, while signals transmitted from the wireless communication devices 246 to the base station 226 may be referred to as uplink signals. It should be noted that reciprocity between the base station 226 and wireless communication device 246 channels is assumed herein. This assumption may require a calibration procedure, which is not described herein.

The base station 226 may transmit signals (e.g., data) to the wireless communication devices 246 using a downlink carrier 244a, while the wireless communication devices 246 may transmit signals (e.g., data) to the base station 226 using an uplink carrier 240a. Additionally or alternatively, the base station 226 may transmit signals to the wireless communication devices 246 using one or more downlink subcarriers 244a-n and the wireless communication devices 246 may transmit signals using one or more uplink subcarriers 240a-n. A carrier 240a, 244a may generally include a range of frequencies or bandwidth used to transmit signals across the channel 238. A subcarrier 240a-n, 244a-n may be a frequency band included within a carrier. In one configuration (using Orthogonal Frequency-Division Multiplexing (OFDM), for example), one or more subcarriers 240a-n, 244a-n may be orthogonal to each other and collectively occupy the carrier bandwidth. Each subcarrier 240a-n, 244a-n may carry a separate stream of symbols or data, for example.

The base station 226 may include a base station clock 228 used to generate downlink carrier/subcarrier 244 frequencies. A wireless communication device clock 248 may be similarly used by the wireless communication device 246 to generate uplink carrier/subcarrier 240 frequencies. However, the wireless communication device clock 248 may not be exactly synchronized with the base station clock 228. When the base station clock 228 and wireless communication device clock 248 are not exactly synchronized, frequency offsets 236 may occur. Each wireless communication device 246 may have a different frequency offset 236.

As will be discussed in more detail below, it may be desirable for corresponding carriers/subcarriers 240, 244 to align in frequency. For example, system performance may be improved when uplink carrier/subcarrier A 240a and downlink carrier/subcarrier A 244a are aligned on the same frequency. However, because the base station clock 228 and wireless communication device clocks 248 may not be exactly synchronized, the subcarrier frequencies 240a, 244a may not be exactly aligned, causing the frequency offset 236 and possibly degrading system performance.

This effect is illustrated on a frequency axis 234 below the base station 226 in FIG. 2. A base station 226 transmits a signal in a transmitted frequency band 230 (e.g., a downlink carrier/subcarrier 244), but receives a signal (e.g., an uplink carrier/subcarrier 240) in a received frequency band 232. As illustrated, the transmitted frequency band 230 and the received frequency band 232 are offset by the frequency offset 236. When the precoding matrix 210 (e.g., SDMA beamforming matrix) is based on channel estimates from received sounding signals 242 (each with a different frequency offset 236, for example), interference in the SDMA downlink may occur because the downlink channel is at different carrier/subcarrier 244 frequencies (e.g., the transmitted frequency band 230) than the received uplink channels (e.g., the received frequency band 232).

The base station 226 may include a channel estimation module 204. The channel estimation module 204 may generate a channel estimate using implicit channel sounding (e.g., sounding signals 242 sent from the wireless communication devices 246). Channel sounding may be deemed "implicit" when the sounding signals 242 do not include explicit channel estimate information. That is, the sounding signals 242 include "implicit" channel information that may be used by the base station 226 to generate a channel estimate. In one configuration, for example, the sounding signal 242 may comprise a preamble of an uplink packet that may be used to derive a corresponding downlink channel. A sounding signal 242 may comprise one or more training packets, for example. In one configuration, a training packet is a short "data" packet (even though it may or may not include any "data" symbols) with a preamble that is used to train the channel. For instance, the preamble may comprise several MIMO-OFDM symbols that are known to both the transmitter (TX) and receiver (RX).

The channel estimation module 204 may use or apply frequency offset compensation 206 and/or amplitude compensation 208. For example, the channel estimation module 204 may generate a channel estimate using one or more sounding signals 242 received from one or more wireless communication devices 246 on the uplink carrier/subcarrier(s) 240. The channel estimation module 204 may apply frequency offset compensation 206 to the channel estimate to compensate or correct for the one or more frequency offset(s) 236. Applying frequency offset compensation 206 to the channel estimate may improve the channel estimate, and thereby improve the accuracy of the precoding matrix 210 computation, which may improve the performance of beamformed or SDMA transmissions. For example, interference 116 between signals intended for different wireless communication devices 246 may be reduced. The channel estimation module 204 may alternatively or additionally apply amplitude compensation 208 to the channel estimate, which may also improve beamformed or SDMA transmission performance. Thus, the channel estimate with frequency offset compensation 206 and/or amplitude compensation 208 may be used to compute the precoding matrix 210. The base station 226 may then use the precoding matrix 210 to transmit data 247 (e.g., packets) to one or more wireless communication devices 246 on the downlink carrier/subcarrier(s) 244a-n.

In the context of a Wireless Local Area Network (WLAN), transmissions may occur asynchronously. Hence, for each received packet, the receiver may need to lock on to the transmitter frequency. For the computation of a precoding matrix 210 (for SDMA, for example), accurate channel estimation 204 may be required (e.g., up to 30 decibels (dB) channel estimation Signal-to-Noise Ratio (SNR)). In the case of implicit channel sounding, a communication device (e.g., base station 226) may need to accurately estimate the uplink sounding frequency offset 236 and reduce or remove it from the estimated channel 238 in order to compute a more accurate or "correct" precoding matrix 210 for downlink 244 transmission. When the downlink transmission involves multiple communication devices (e.g., wireless communication devices 246), each communication device may require a different compensation.

Figure 3:
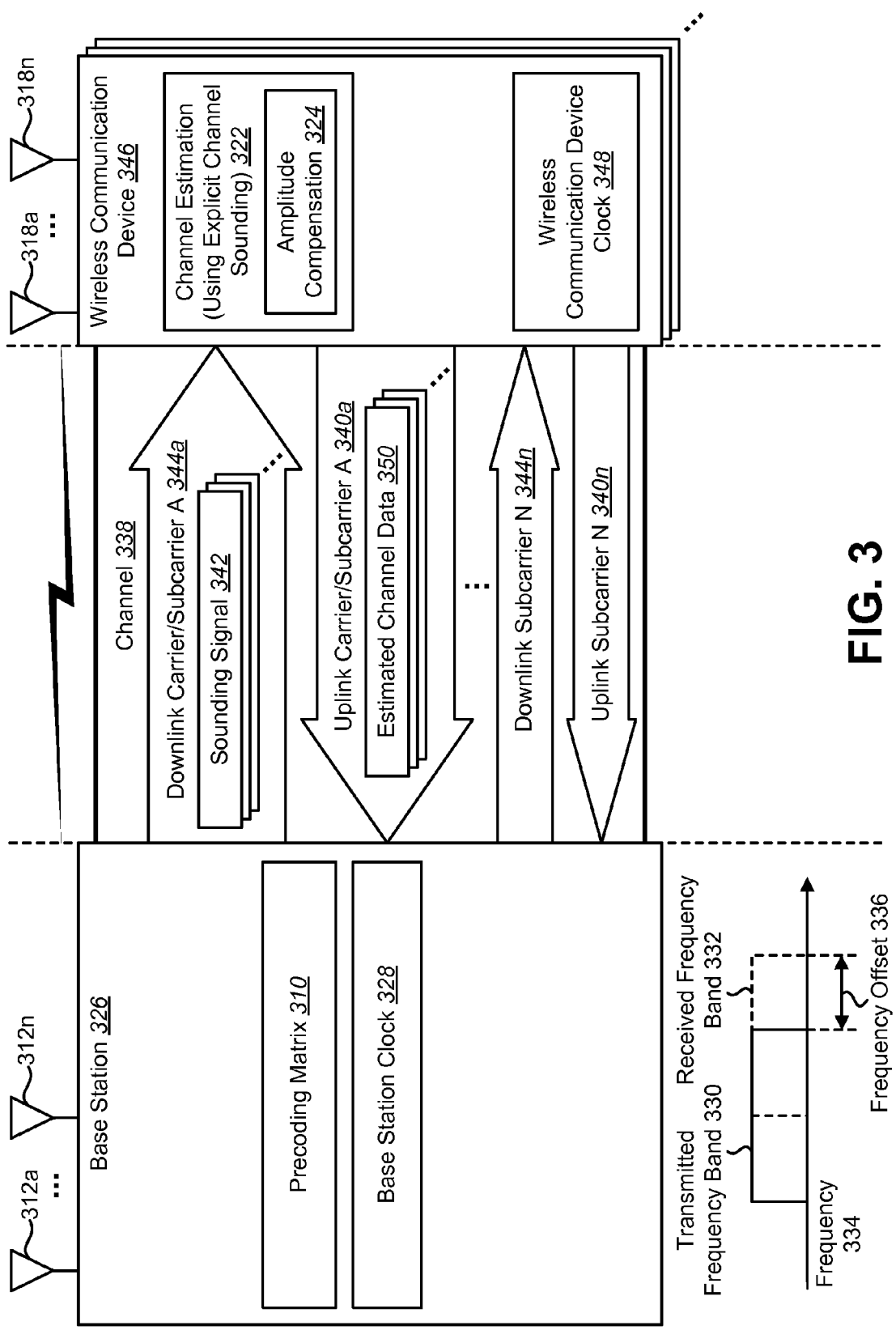
FIG. 3 is a block diagram illustrating one configuration of a base station and one or more wireless communication devices in which systems and methods for explicit channel sounding for beamforming may be implemented.

FIG. 3 is a block diagram illustrating one configuration of a base station 326 and one or more wireless communication devices 346 in which systems and methods for explicit channel sounding for beamforming may be implemented. "Explicit" sounding may mean that the channel information feedback may be sent in a data portion of a packet. For example, a wireless communication device 346 may measure the channel 338 from the base station 326 (e.g., access point) by performing channel estimation on the preamble of a training packet (e.g., sounding signal 342) from the base station 326 (e.g., access point). The wireless communication device 346 then sends this channel estimate (e.g., estimated channel data 350) in a data packet to the base station 326 (e.g., access point), such that the base station 326 does not have to use the preamble of an uplink packet to derive the corresponding downlink channel (e.g., using implicit sounding as described in FIG. 2).

A base station 326 may communicate with one or more wireless communication devices 346 across a channel 338 using multiple antennas 312a-n. The one or more wireless communication devices 346 may each communicate with the base station 326 across the channel 338 using one or more antennas 318a-n. The base station 326 may transmit signals (e.g., data) to the wireless communication devices 346 using a downlink carrier/subcarrier(s) 344a-n, while the wireless communication devices 346 may transmit signals (e.g., data) to the base station 326 using an uplink carrier/subcarrier(s) 340a-n.

The base station 326 may include a base station clock 328 used to generate downlink carrier/subcarrier 344 frequencies. A wireless communication device clock 348 may be similarly used by the wireless communication device 346 to generate uplink carrier/subcarrier 340 frequencies. Because the clocks 328, 348 may not be exactly synchronized, frequency offsets 336 may occur, possibly degrading system performance. Each wireless communication device 346 may have a different frequency offset 336. This effect is illustrated on a frequency axis 334 below the base station 326 in FIG. 3. A base station 326 transmits a signal in a transmitted frequency band 330 (e.g., a downlink carrier/subcarrier 344), but receives a signal (e.g., an uplink carrier/subcarrier 340) in a received frequency band 332. A similar frequency offset may be observed from the wireless communication device(s) 346. As illustrated, the transmitted frequency band 330 and the received frequency band 332 are offset by the frequency offset 336. When the precoding matrix 310 (e.g., SDMA beamforming matrix) is based on channel estimates from received sounding signals 342, (each with a different frequency offset 336, for example), interference in the SDMA downlink may occur because the downlink channel is at different carrier/subcarrier 344 frequencies (e.g., the transmitted frequency band 330) than the received uplink channels (e.g., the received frequency band 332).

Each of the one or more wireless communication devices 346 may include a channel estimation module 322. The channel estimation module 322 may generate a channel estimate using one or more sounding signals 342 sent from the base station 326. In this case, channel sounding may be explicit. For example, the channel estimation module 322 may use the one or more sounding signals 342 to generate a channel estimate. The channel estimate may be numerically represented and sent to the base station 326 as estimated channel data 350. Thus, the estimated channel data 350 explicitly includes channel estimate information.

The channel estimation module 322 may use or apply amplitude compensation 324. For example, the channel estimation module 322 may generate a channel estimate using one or more sounding signals 342 received from the base station 326 on the downlink carrier/subcarrier(s) 344. The channel estimation module 322 may apply amplitude compensation 324 to the channel estimate. Applying amplitude compensation 324 to the channel estimate may improve the channel estimate, and thereby improve the accuracy of the precoding matrix 310 computation, which may improve the performance of SDMA transmissions.

The channel estimate (including amplitude compensation, for example) may be numerically represented as estimated channel data 350. Each wireless communication device 346 may send the estimated channel data 350 to the base station 326. The base station 326 may use the estimated channel data 350 received from each of the wireless communication devices 346 to compute the precoding matrix 310. The base station 326 may then use the precoding matrix 310 to transmit SDMA signals (e.g., data packets) to one or more wireless communication devices 346 on the downlink carrier/subcarrier(s) 344a-n.

Figure 4:
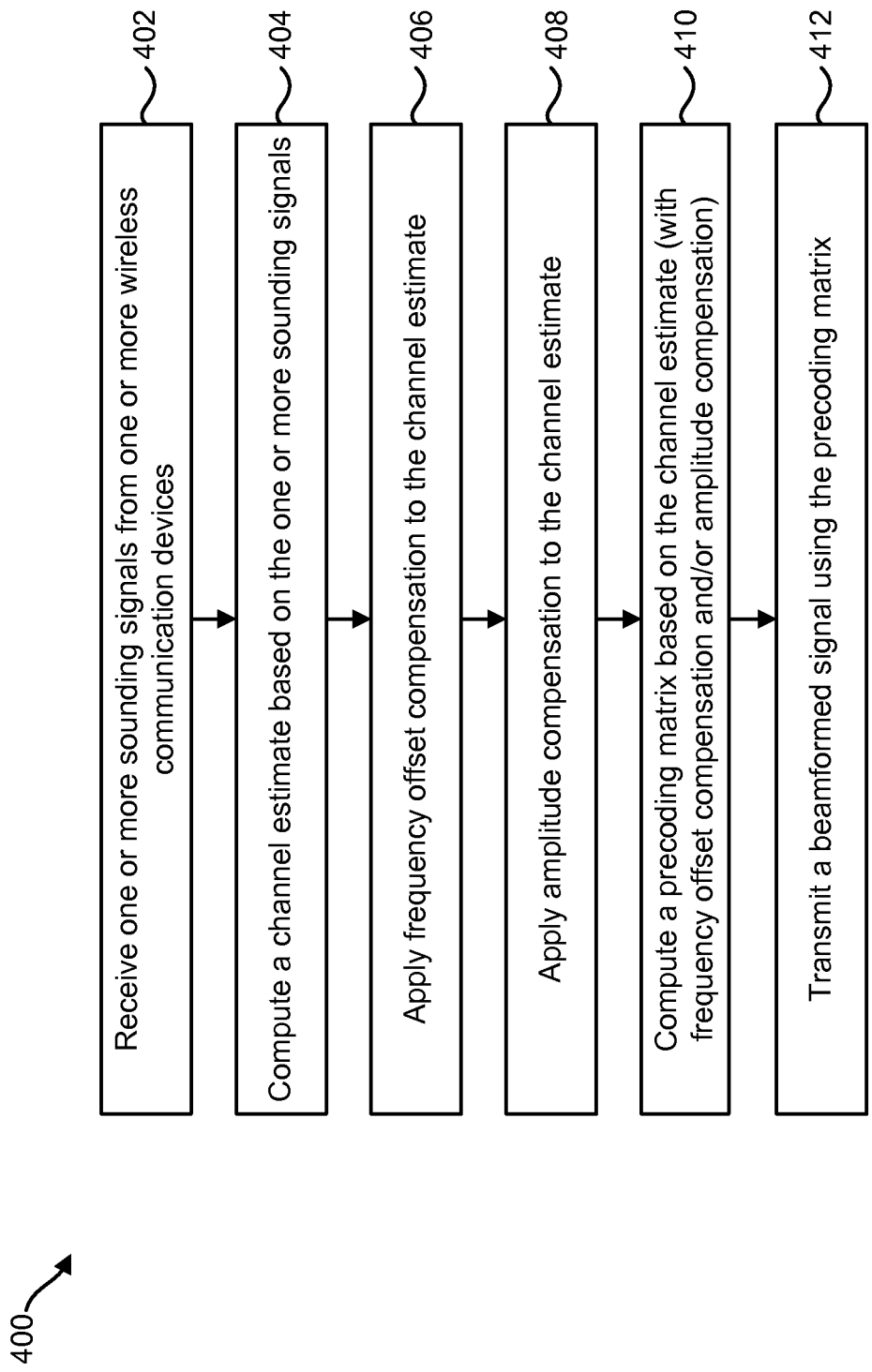
FIG. 4 is a flow diagram illustrating one configuration of a method for transmitting beamformed signals using implicit channel sounding.

FIG. 4 is a flow diagram illustrating one configuration of a method 400 for transmitting beamformed signals using implicit channel sounding. In FIGS. 4, 5 and 6, the terms "base station" and "wireless communication device" or derivatives thereof are used to lend clarity to the disclosure. However, the use of these terms should not limit these methods to application only to base stations and wireless communication devices. Rather, the methods described in connection with FIGS. 4, 5 and 6 may generally be implemented on any communication device.

As illustrated in FIG. 4, a base station 226 may receive 402 one or more sounding signals 242 from one or more wireless communication devices 246. For example, each wireless communication device 246 sends a sounding signal 242 (e.g., training packet) to the base station 226. Sounding signals 242 (e.g., training packets) from different wireless communication devices 246 may be sent and/or received at different times. The base station 226 may compute 404 a channel estimate based on the one or more sounding signals 242. As used herein, the term "channel estimate" may include one or more estimates for one or more channels. For example, a "channel estimate" may be expressed as a matrix including channel estimates for several channels.

The base station 226 may apply 406 frequency offset compensation to the channel estimate. More detail regarding the application 406 of frequency offset compensation is given below. The base station 226 may optionally apply 408 amplitude compensation to the channel estimate. For example, the base station 226 may include one or more receiver filters that affect the channel estimate. Applying 408 the amplitude compensation to the channel estimate may compensate for (e.g., remove) the effect of the one or more receiver filters.

The base station 226 may compute 410 a precoding matrix 210 based on the channel estimate. For example, the precoding matrix 210 may be computed using the channel estimate that has had frequency offset compensation 206 and/or amplitude compensation 208 applied to it. The base station 226 may then transmit 412 a beamformed (e.g., SDMA) signal (e.g., data) using the precoding matrix. In this way, beamformed or SDMA transmission performance may be improved.

FIG. 5 is a flow diagram illustrating one configuration of a method 500 for transmitting beamformed signals using explicit channel sounding. A base station 326 may send 502 one or more sounding signals 342 (e.g., training packets) to one or more wireless communication devices 346. Each of the one or more wireless communication devices 346 may compute estimated channel data 350 using the one or more sounding signals 342 and send it 350 to the base station 326. The base station 326 may receive 504 the estimated channel data 350. The estimated channel data 350 may be a numeric representation of the estimated channel. That is, the base station 326 may receive different estimated channel data 350 from each of the wireless communication devices 346. The base station 326 may compute 506 a precoding matrix 310 based on the estimated channel data 350. The base station 326 may then transmit 508 a beamformed (e.g., SDMA) signal (e.g., data) using the precoding matrix 310.

FIG. 6 is a flow diagram illustrating one configuration of a method 600 for receiving beamformed signals using explicit channel sounding. One or more wireless communication devices 346 may receive 602 one or more sounding signals 342 (e.g., training packets). The one or more sounding signals 342 may be sent from a base station 326. Each of the one or more wireless communication devices 346 may compute 604 a channel estimate based on the one or more sounding signals 342. Each of the one or more wireless communication devices 346 may apply 606 amplitude compensation 324 to the estimated channel. For example, each wireless communication device 346 may include one or more receiver filters that affect the channel estimate. The application 606 of amplitude compensation 324 to the channel estimate may compensate for (e.g., remove) the effect of the one or more receiver filters. The one or more wireless communication devices 346 may generate a numeric representation of the channel estimate, thereby producing estimated channel data 350. The one or more wireless communication devices 346 may send 608 the estimated channel data 350 to a base station 326. This estimated channel data 350 may be deemed Channel State Information (CSI) and may be compressed. As discussed above in connection with FIG. 5, the base station 326 may use the received estimated channel data 350 to compute 506 a precoding matrix 310 and transmit 508 an SDMA signal using the precoding matrix 310. The one or more wireless communication devices 346 may receive 610 a beamformed (e.g., SDMA) signal (e.g., data, packets, etc.). The beamformed (e.g., SDMA) signal may be transmitted 508 from the base station 326.

Figure 7:
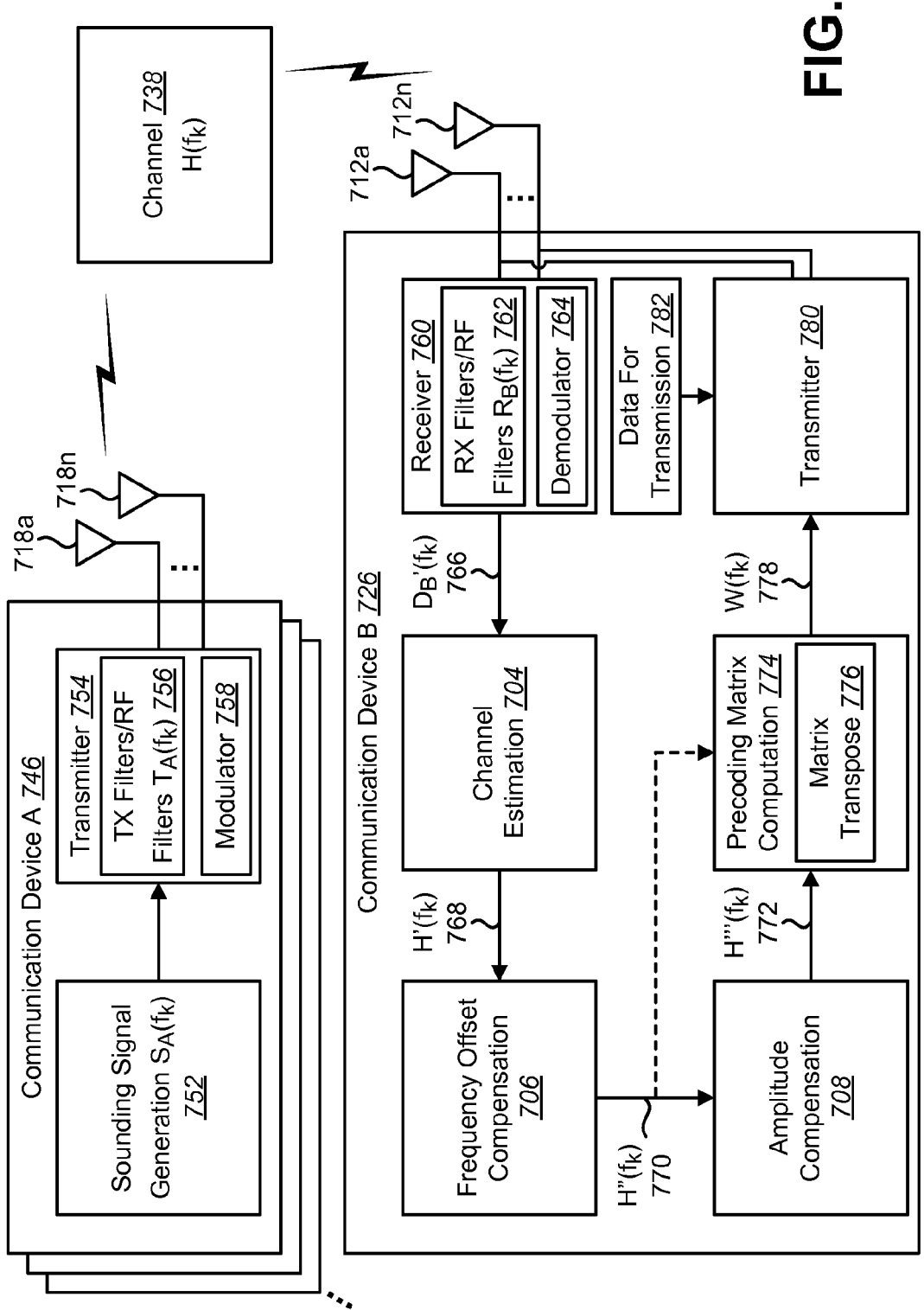
FIG. 7 is a block diagram illustrating a more specific configuration of communication devices in which systems and methods for transmitting beamformed signals using implicit channel sounding may be implemented.

FIG. 7 is a block diagram illustrating a more specific configuration of communication devices 726, 746 in which systems and methods for transmitting beamformed signals using implicit channel sounding may be implemented. Examples of communication devices 746, 726 include base stations 226, 326 and wireless communication devices 246, 346. For example, one or more communication devices A 746 may be one or more wireless communication devices or access terminals. Furthermore, communication device B 726 may be a base station or access terminal. Alternatively, the one or more communication devices A 746 may be one or more base stations and communication device B 726 may be a wireless communication device. Several equations are shown and described with a capital subscript "$_A$" denoting communication device A 746 and a capital subscript "$_B$" denoting communication device B 726.

The one or more communication devices A 746 may include a sounding signal generation module 752, a transmitter 754 and/or one or more antennas 718a-n. Communication device B 726 may include one or more antennas 712a-n, a receiver 760, a channel estimation module 704, a frequency offset compensation module 706, an amplitude compensation module 708, a precoding matrix computation module 774, data for transmission 782 and/or a transmitter 780.

FIG. 7 illustrates one or more communication devices A 746 communicating with communication device B 726 over a channel 738, using antennas 718a-n, 712a-n. For the sake of example, however, a Single-Input Single-Output (SISO) channel between communication device A 746 and communication device B 726 will be described initially. The Multiple-Input Multiple-Output (MIMO) channel case (described later) is a direct extension of the SISO channel case described.

A sounding signal (e.g., training packet) has a baseband frequency spectrum S(f), where f is the frequency in the real domain. That is, the sounding signal generation module 752 may generate a sounding signal (e.g., training packet) 242 with a frequency spectrum S(f). The transmitter 754 on communication device A 746 may format the sounding signal 242 or training packet for transmission. For example, the transmitter 754 may include one or more Transmit (TX) filters and/or Radio Frequency (RF) filters 756. T(f) represents the baseband frequency response of the TX filters and/or RF filters 756. The transmitter 754 in communication device A 746 may also include a modulator 758. The modulator 758 may modulate the sounding signal 242 for transmission. One example of modulation that may be used in accordance with the systems and methods herein is OFDM modulation. After TX/RF filtering 756 and/or modulation 758, the sounding signal 242 may be transmitted across a channel 738 to communication device B 726 using an antenna 718 (for the SISO case).

A baseband representation of the channel 738 may be defined as H(f). The sounding signal 242 may be received via the channel 738 by communication device B 726 using an antenna 712 (for the SISO case). The receiver 760 may receive the sounding signal 242. The receiver 760 may include receive (RX) and/or RF filters 762. R(f) represents the baseband frequency response of the RX and/or RF filters 762. The receiver 760 may also include a demodulator 764. The receiver may demodulate 764 the sounding signal and/or filter 762 the sounding signal. A baseband received signal received at communication device B 726 may be defined as Y(f) as illustrated in Equation (1).

$$Y(f)=R(f)H(f)T(f)S(f) \qquad (1)$$

In the digital domain, the received signal may be defined as $D(f_k)$ as illustrated in Equation (2).

$$D(f_k)=R(f_k)H(f_k)T(f_k)S(f_k) \qquad (2)$$

In Equation (2), $f_k$ is the frequency of tone k. From the received signal $D(f_k)$, a communication device B 726 may compute a channel estimate $H'(f_k)$ 768, as illustrated in Equation (3).

$$H'(f_k)=R(f_k)H(f_k)T(f_k) \qquad (3)$$

As can be observed in Equation (3), the channel estimate H'($f_k$) 768 may be affected by the transmission filters 756 T($f_k$) and the reception filters 762 R($f_k$). It should also be noted that the computations illustrated in Equations (1), (2) and (3) do not include a frequency offset, which will be described in more detail as follows.

If communication device B 726 is affected by a frequency offset $f_{off}$ (and it is assumed that communication device A 746 has no frequency offset), the baseband signal received by communication device B 726 may be $Y_B(f-f_{off})$, as illustrated in Equation (4).

$$Y_B(f-f_{off})=R_B(f-f_{off})H(f)T_A(f)S_A(f) \quad (4)$$

Going to the digital baseband domain of communication device A 746, the received signal may be $D_B(f_k)$, as illustrated in Equation (5).

$$D_B(f_k)=R_B(f_k)H(f_k+f_{off})T_A(f_k+f_{off})S_A(f_k+f_{off}) \quad (5)$$

Assuming that the communication device B 726 receiver 760 digitally shifts the channel 738 in order to match the position of the transmitted tones with that of the receiver 760 tones, the received signal may be $D_B'(f_k)$ 766, as illustrated in Equation (6).

$$D_B'(f_k)=R_B(f_k+f_{off})H(f_k)T_A(f_k)S_A(f_k) \quad (6)$$

For example, a transmitter 780 (e.g., communication device B 726) may select a tone for transmission from a number of available tones. A receiver 760, however, may not receive the transmitted signal at the same frequency tone. The receiver 760 may digitally shift or map the received signal such that it corresponds to the same frequency tone that it was transmitted from. Using the channel estimation module 704, communication device B 726 may compute a channel estimate H'($f_k$) 768 based on the received signal $D_B'(f_k)$ 766, as illustrated in Equation (7).

$$H'(f_k)=R_B(f_k-f_{off})H(f_k)T_A(f_k) \quad (7)$$

It should be noted that the receiver estimate H'($f_k$) 768 contains the channel H($f_k$) 738, which is the channel 738 experienced by the tone k at communication device A 746.

In the following, the systems and methods described are extended from the SISO case to the MIMO case. In implicit channel sounding, the sounding receiver (e.g., communication device B 726 in FIG. 7) is also the beamformer. Assume that there are a number $N_A$ of communication devices A 746 with one antenna each 718 (although in the math it may be expressed as one communication device A 746 with $N_A$ antennas 718). Also assume that the beamformer (communication device B 726) has $N_B$ antennas 712. The channel estimates H'($f_k$) 768 may be expressed as a matrix with dimensions [$N_A$, $N_B$] (for each subcarrier $f_k$, for example). The baseband frequency response of RX/RF filters 762 for communication device B 726 may be expressed as a matrix $R_B(f-f_{off})$ with dimensions [$N_B$, $N_B$]. $R_B$ may be a diagonal matrix. The baseband frequency response of RX/RF filters on communication device A 746 (not shown in FIG. 7) may be expressed as a diagonal matrix $R_A(f-f_{off})$ with dimensions [$N_A$, $N_A$]. The baseband frequency response of TX/RF filters for communication device B 726 (not shown in FIG. 7) may be expressed as a matrix $T_B(f-f_{off})$ with dimensions [$N_B$, $N_B$]. $T_B$ may be a diagonal matrix. The baseband frequency response of TX/RF filters 756 on communication device A 746 may be expressed as a diagonal matrix $T_A(f-f_{off})$ with dimensions [$N_A$, $N_A$].

The frequency offset compensation module 706 may apply frequency offset compensation to (e.g., perform a frequency shift adjustment on) the channel estimates H'($f_k$) 768 to yield H''($f_k$)=H'($f_k+f_{off}$) 770, as illustrated in Equation (8).

$$H''(f_k)=H'(f_k+f_{off})=R_B(f_k)H(f_k+f_{off})T_A(f_k+f_{off}) \quad (8)$$

The precoding matrix computation module 774 may use the frequency offset compensated channel estimate H''($f_k$) 770 to compute a precoding matrix (e.g., beamforming matrix) W($f_k$) 778 that may be used at communication device B 726. The precoding matrix computation module 774 may use a matrix transpose function or module 776 to transpose the frequency offset compensated channel estimate H''($f_k$) 770 to yield $H^{T''}(f_k)$. $H^{T''}(f_k)$ 770 may be used to compute the precoding matrix W($f_k$) 778. For example, any known beamforming technique may be used to calculate a beamforming or precoding matrix W($f_k$) 778 from the frequency corrected channel $H^{T''}(f_k)$ 770. For instance, in the case of a single-user transmission from a base station (e.g., communication device B 726) to a wireless communication device (e.g., communication device A 746) with channel $H^{T''}(f_k)$ 770, W($f_k$) 778 may be computed as the pseudo-inverse of $H^{T''}(f_k)$ 770 according to an equation W($f_k$)=$H^{T''}(H^{T''}H'')^{-1}$.

In the case where communication device B 726 (e.g., the sounding signal receiver and beamformer) is affected by a frequency offset $f_{off}$, the received beamformed signal at communication device A 746 may be expressed as $Y_A(f)$, as illustrated in Equation (9).

$$Y_A(f)=R_A(f)H^T(f)T_B(f-f_{off})W_B(f-f_{off})S_B(f-f_{off}) \quad (9)$$

In the digital domain, the received beamformed signal at communication device A 746 may be expressed as $D_A(f_k)$, as illustrated in Equation (10).

$$D_A(f_k)=R_A(f_k)H^T(f_k)T_B(f_k-f_{off})W_B(f_k-f_{off})S_B(f_k-f_{off}) \quad (10)$$

That is, as illustrated in Equation (11):

$$D_A(f_k+f_{off})=R_A(f_k+f_{off})H^T(f_k+f_{off})T_B(f_k)W_B(f_k)S_B(f_k) \quad (11)$$

For example, Equation (10) may be valid for any frequency $f_k$, so $f_k$ may be replaced by $f_k+f_{off}$ to give Equation (11). That is, the channel estimate H'($f_k$)=$R_B(f_k-f_{off})H(f_k)T_A(f_k)$ 768 is not the correct channel estimate for beamforming at communication device B 726. It should be noted that $W_B$ would be computed based on a channel that is different from the one to which $W_B$ may be applied. In Equation (11), for example, $W_B$ is applied to $H^T(f_k+f_{off})$, which is different than H' due to the frequency offset. Neglecting the effect of R and T, it can be observed that the estimated channel H'($f_k$)=H($f_k$) is in fact a frequency shifted version of the actual channel 738 that would be experienced by a transmission from communication device B 726. Such frequency shifts cause an error in the estimate of the channel 738 on each tone. Moreover, the error may be different for each TX-RX 712, 718 antenna pair, depending on the specific channel 738 realization. This implies that beamforming is not done properly (even in the case where the offset is the same across communication devices A) and cross-interference will be present across streams.

In the case of implicit beamforming, it may thus be beneficial to obtain the "correct" channel estimate by compensating for the frequency offset before computing the beamforming weights (e.g., precoding matrix). The "correct" channel estimate H''($f_k$) 770 to be used is thus illustrated in Equation (12). It should be noted that "compensation" refers to a frequency shift of the channel 738 estimates.

$$H''(f_k)=H'(f_k+f_{off})=R_B(f_k)H(f_k+f_{off})T_A(f_k+f_{off}) \quad (12)$$

Although the channel estimate is affected by the RX/RF filters $R_B(f_k)$ 762 on communication device B 726 and the TX/RF filters $T_A(f_k+f_{off})$ 756 on communication device A 746, the beamformed data goes through TX/RF filters $T_B(f_k)$ (not shown) on communication device B and RX/RF filters $R_A(f_k+f_{off})$ (not shown) on communication device A. Thus, calibration may ensure that $R_B^{-1}(f_k)T_A(f_k+f_{off})=kI$, where k is a scaling factor and I is the identity matrix. If this is not ensured, then a scaling error in the channel estimate (different for each TX antenna) may be present, which may affect precoding. Without calibration in place, it may be assumed that $R_B(f_k)=k_1I$ and $T_A(f_k+f_{off})=k_2I$, where $k_1$ and $k_2$ are scaling factors. It should be noted that $R_A^{-1}(f_k+f_{off})T_B(f_k)$ implies a constant scaling per data RX antenna, which does not affect precoding.

Compensation for $R_B(f_k)$ (e.g., amplitude compensation 708) may lead to a performance gain, especially in the case where $R_B(f_k)$ presents significant attenuation for some tones. Thus, the amplitude compensation module 708 may compensate for the effects of the receive filter $R_B(f_k)$ according to Equation (13).

$$H'''(f_k)=R_B(f_k)^{-1}H'' \quad (13)$$

For example, the channel estimate may be directly compensated by using $R_B(f_k)$: $H'''(f_k)=R_B^{-1}(f_k)H''(f_k)$. The frequency offset compensated amplitude compensated channel estimate $H'''(f_k)$ 772 may thus be used for the precoding matrix computation 774, yielding the precoding matrix $W(f_k)$ 778. The precoding matrix $W(f_k)$ 778 may be used by the transmitter 780 to transmit data 782 for transmission. In other words, communication device B 726 may use the precoding matrix $W(f_k)$ 778 to transmit an SDMA signal including data 782 for transmission.

The benefits of transmitting beamformed signals using implicit channel sounding were tested with a simulation in accordance with the systems and methods herein. In this simulation, several parameters were assumed. A base station with four antennas and wireless communication devices with one antenna each were assumed. Simulations with one and three wireless communication devices were performed. A 20 megahertz (MHz) mode with mixed mode packets and a beamformed header were also assumed. Channel D-LOS (Line of Sight) at 6 gigahertz was also assumed. The Channel D-LOS is a particular channel module that may be used in IEEE 802.11 simulations. 100 Byte packets were also assumed. Frequency offsets of 0, 20 and 40 parts per million (ppm) were assumed for the case with three wireless communication devices and a 40 ppm frequency offset was assumed for the case with one wireless communication device. The simulation demonstrated that amplitude compensation yielded a 1 decibel (dB) gain in performance.

Figure 8:
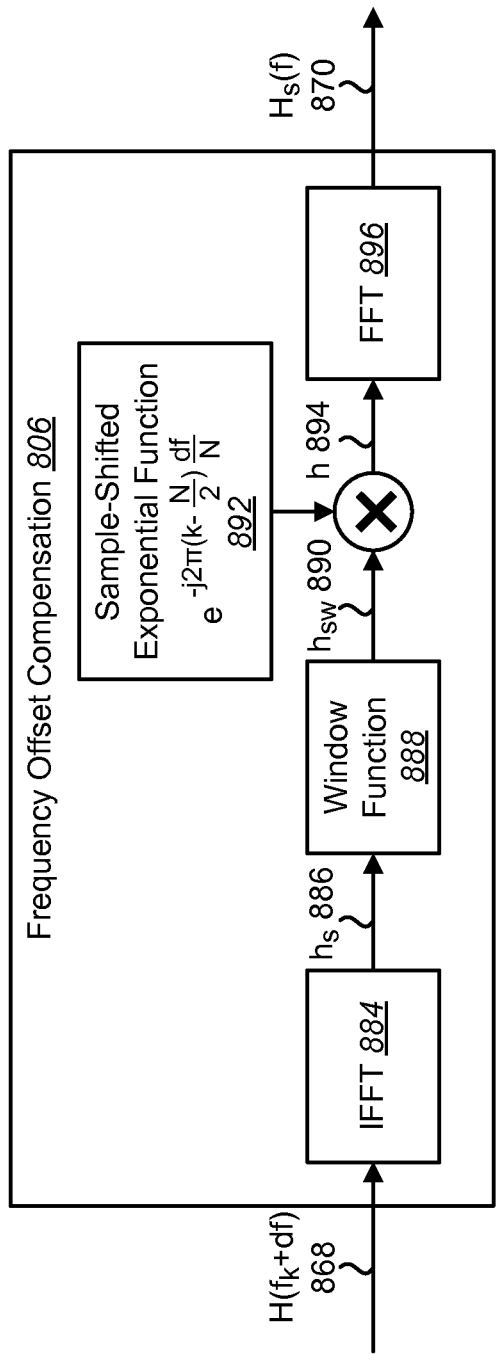
FIG. 8 is a block diagram illustrating one configuration of a frequency offset compensation module.

FIG. 8 is a block diagram illustrating one configuration of a frequency offset compensation module 806. For FIG. 8, let $H(f_k+df)$ 868 indicate a (raw) channel estimate, affected by the frequency offset df. Furthermore, let $h_s$ 886 indicate the time-domain representation of $H(f_k+df)$ 868. The frequency offset compensation module 806 may compute a time-domain channel estimate $h_s$ 886 by taking the Inverse Fast Fourier Transform (IFFT) 884 of the raw channel estimate $H(f_k+df)$ 868 as illustrated by Equation (14).

$$h_s=\text{IFFT}\{H(f_k+df)\} \quad (14)$$

In Equation (13), IFFT{ } is an N-point IFFT.

The frequency offset compensation module 806 may optionally apply a window function 888 to the time-domain channel estimate $h_s$ 886. The window function may be useful for better performance (in addition to or alternatively from other noise reduction). One example of a window function 888 is a raised cosine window. In one implementation, the raised cosine window function 888 may be applied to tones [32-Wlen:60], where Wlen is the raised cosine length. Applying the window function 888 to $h_s$ 886 yields or produces a windowed time-domain channel estimate $h_{sw}$ 890. The frequency offset compensation module 806 may apply frequency correction to $h_s$ 886 or $h_{sw}$ 890 to yield a frequency offset compensated time-domain channel estimate h 894. This may be accomplished by multiplying $h_s$ 886 or $h_{sw}$ 890 by a sample-shifted exponential function 892. This operation may be carried out as illustrated in Equation (15).

$$h(k) = h_s(k)\exp\left(-j2\pi\left(k - \frac{N}{2}\right)\frac{df}{N}\right) \text{ or } \quad (15)$$

$$h(k) = h_{sw}(k)\exp\left(-j2\pi\left(k - \frac{N}{2}\right)\frac{df}{N}\right)$$

In Equation (14), N/2 is a sample shift. The sample shift is used to ensure that the phase discontinuity in the phase slope correction is outside the band instead of around Direct Current (DC). This avoids Gibbs distortion when taking a Fast Fourier Transform (FFT) 896 of h 894. It should be noted that windowing may be optional. The frequency offset compensation module 806 may compute the FFT 896 of the shifted channel response (e.g., the frequency offset compensated time-domain channel estimate h). This is illustrated in Equation (16).

$$H_s(f)=\text{FFT}\{h\} \quad (16)$$

This operation may produce a frequency offset compensated frequency domain channel estimate $H_s(f)$ 870.

The benefits of using the algorithm illustrated in FIG. 8 were tested with a simulation in accordance with the systems and methods herein. In this simulation, several parameters were assumed. A base station with four antennas and wireless communication devices with one antenna each were assumed. Simulations with one and three wireless communication devices were performed. A 20 megahertz (MHz) Greenfield (GF) mode and channel D-LOS at 6 gigahertz was also assumed. Greenfield (GF) may refer to a particular 802.11n short or long preamble format. 100 Byte packets were also assumed. Frequency offsets of 0, 20 and 40 parts per million (ppm) were assumed for the case with three wireless communication devices and a 40 ppm frequency offset was assumed for the case with one wireless communication device. The simulation demonstrated performance gains in using the algorithm illustrated in FIG. 8 when compared to an algorithm based on Minimum Mean Square Error (MMSE). Furthermore, the MMSE algorithm is more complex than the algorithm illustrated in FIG. 8.

Figure 9:
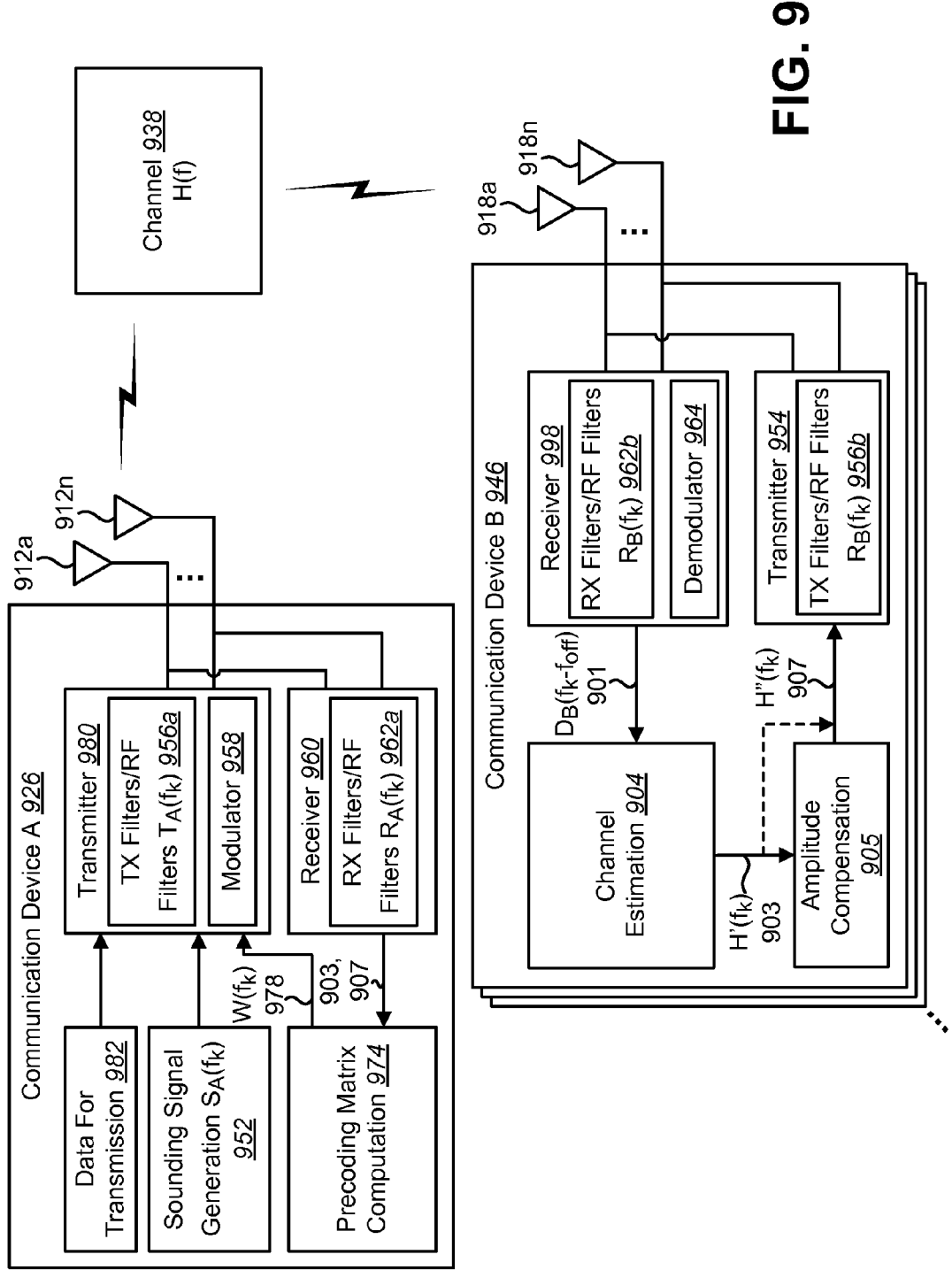
FIG. 9 is a block diagram illustrating a more specific configuration of communication devices in which systems and methods for transmitting and receiving beamformed signals using explicit channel sounding may be implemented.

FIG. 9 is a block diagram illustrating a more specific configuration of communication devices 926, 946 in which systems and methods for transmitting and receiving beamformed signals using explicit channel sounding may be implemented. Examples of communication devices 926, 946 include a base station, access point, wireless communication device and access terminal. For example, communication device A 926 may be a base station or access point and one or more communication devices B 946 may be one or more wireless communication devices or access terminals.

The communication device A 926 may include data for transmission 982, a sounding signal generation module 952, a precoding matrix computation module 974, a transmitter 980, a receiver 960 (e.g., including RX/RF filters 962a) and one or more antennas 912. The sounding signal generation module 952 may generate a sounding signal or training packet with frequency response $S_A(f)$ (or $S_A(f_k)$ with a frequency at tone k). The transmitter 980 may include TX/RF filters 956a with a baseband frequency response $T_A(f)$ ($T_A(f_k)$ at tone k). The sounding signal (e.g., training packet) may be filtered (using the TX/RF filters 956a), modulated (using modulator 958), and/or transmitted by the transmitter 980. The sounding signal may be transmitted through a channel 938 with baseband frequency response $H(f)$ ($H(f_k)$ at tone k).

The one or more communication devices B 946 may include one or more antennas 918, a receiver 998, a channel estimation module 904, an amplitude compensation module 905 and a transmitter 954 (e.g., including TX/RF filters 956b). The receiver 998 may include RX/RF filters 962b with a baseband frequency response $R_B(f)$ ($R_B(f_k)$ at tone k). The receiver may also include a demodulator 964. Using one or more antennas 918, the receiver 998 may demodulate 964 and/or filter 962b a received sounding signal (e.g., training packet). The channel estimation module 904 may use the received sounding signal to generate a channel estimate $H'(f_k)$ 903. Optionally, the amplitude compensation module 905 may compensate for the effect of the RX/RF filters $R_B(f_k)$ 962b. That is, the amplitude compensation module 905 may generate an amplitude compensated channel estimate $H''(f_k)$ 907. The channel estimate $H'(f_k)$ 903 or the amplitude compensated channel estimate $H''(f_k)$ 907 may be formatted into a numeric representation of the channel estimate 903, 907 and transmitted to communication device A 926 using the transmitter 954. The numeric representation of the channel estimate $H'(f_k)$ 903 or $H''(f_k)$ 907 may be received by communication device A 926 using one or more antennas 912 and a receiver 960. The precoding matrix computation module 974 may use the channel estimate $H'(f_k)$ 903 or $H''(f_k)$ 907 to compute the precoding matrix $W(f_k)$ 978. The precoding matrix $W(f_k)$ 978 may be used by the transmitter 980 to generate a beamformed or SDMA signal (data for transmission 982, for example).

As illustrated by the discussion above, the sounding transmitter (e.g., communication device A 926) is also the beamformer in the case of explicit channel sounding. In the configuration illustrated in FIG. 9, no frequency shift adjustment (e.g., frequency offset compensation) may be needed on the channel estimates $H'(f_k)$ 903 or $H''(f_k)$ 907 fed back from the sounding receiver (e.g., communication device B 946) to the beamformer (communication device A 926).

For purposes of example, assume that communication device A 926 has $N_A$ antennas 912. Further, assume that the channel estimate $H'(f_k)$ 903 is expressed as a matrix with dimensions $[1, N_A]$ and that the baseband frequency response of the TX/RF filters 956a $T_A(f_k)$ is expressed as a diagonal matrix with dimensions $[N_A, N_A]$. The precoding matrix (e.g., beamforming matrix) may be defined as a matrix $W(f_k)$ 978. The precoding matrix $W(f_k)$ 978 may be computed using explicit feedback $H'(f_k)$ 903 or $H''(f_k)$ 907 and may be used at communication device A 926. In the case that the data (and sounding) receiver (e.g., communication device B 946) is affected by a frequency offset $f_{off}$, the received baseband signal $D_B(f_k-f_{off})$ 901 at communication device B 946 may be expressed as illustrated in Equation (17). In Equation (17), $D_B$, $R_B$ and $S_A$ are expressed as matrices.

$$D_B(f_k-f_{off})=R_B(f_k-f_{off})H(f_k)T_A(f_k)S_A(f_k) \quad (17)$$

That is, it is correct to use $H'(f_k)$ 903 (shown in Equation (18) below) to compute $W(f_k)$ 978. The same conclusion follows when multiple communication devices B 946 are present.

$$H'(f_k)=R_B(f_k-f_{off})H(f_k)T_A(f_k) \quad (18)$$

Compensation for the effects of the RX/RF filters $R_B(f_k)$ 962b may be optional, but useful. Both $T_A(f_k)$ and $R_B(f_k-f_{off})$ in $H'(f_k)$ 903 (in Equation (18)) apply a complex scaling factor to each tone, which is a constant per data receive antenna 918. Incorrectly estimating the scaling factors, however, may not result in a loss of orthogonality. However, compensation for $R_B(f_k-f_{off})$ may lead to a performance increase, especially in the case where $R_B(f_k-f_{off})$ presents a notch. In such a case, compensating for $R_B(f_k-f_{off})$ may avoid an increase in transmit power for the notched tones. Compensating for $R_B(f_k-f_{off})$ to generate an amplitude compensated channel estimate $H''(f_k)$ 907 may be accomplished as illustrated in Equation (19).

$$H''(f_k)=R_B^{-1}(f_k-f_{off})H'(f_k) \quad (19)$$

The amplitude compensation module 905 may alternatively generate the amplitude compensated channel estimate $H''(f_k)$ 907 as illustrated in Equation (20).

$$H''(f_k)=H'(f_k)/R_B(f_k) \quad (20)$$

The compensation illustrated in Equation (20) uses a non-shifted filter and is nearly equivalent to the compensation illustrated in Equation (19). However, using the non-shifted filter may be beneficial in that communication device B 946 may not need to store or compute a different filter (as in Equation (19)).

The benefits of receiving beamformed signals using explicit channel sounding were tested with a simulation in accordance with the systems and methods herein. In this simulation, several parameters were assumed. A base station with four antennas and wireless communication devices with one antenna each were assumed. Simulations with one and three wireless communication devices were performed. A 20 megahertz (MHz) mode with mixed mode packets and a beamformed header were also assumed. Channel D-LOS (Line of Sight) at 6 gigahertz was also assumed. 100 Byte packets were also assumed. Frequency offsets of 0, 20 and 40 parts per million (ppm) were assumed for the case with three wireless communication devices and a 40 ppm frequency offset was assumed for the case with one wireless communication device. The simulation demonstrated that amplitude compensation demonstrated a gain in performance. The simulation also demonstrated that the non-shifted filter illustrated in Equation (20) performed nearly as well as the shifted filter illustrated in Equation (19).

Figure 10:
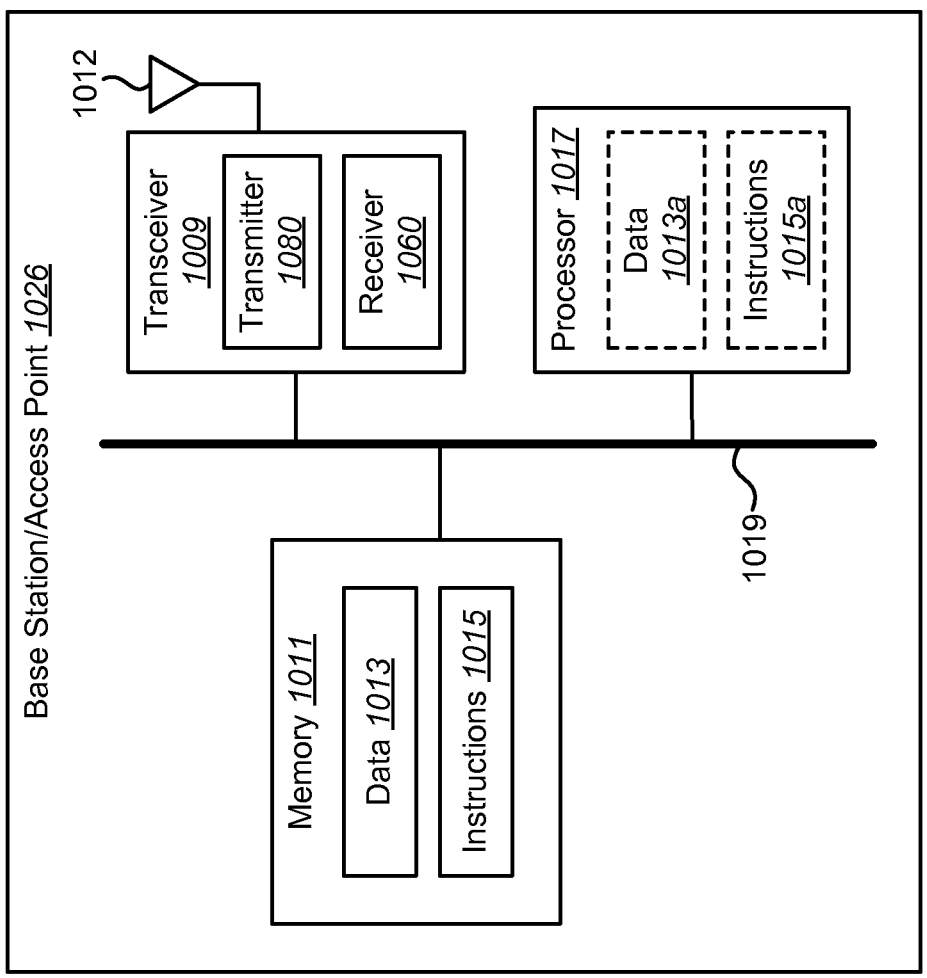
FIG. 10 illustrates certain components that may be included within a base station or access point.

FIG. 10 illustrates certain components that may be included within a base station or access point 1026. The base stations 226, 326 or communication devices 726, 926 discussed previously may be configured similarly to the base station or access point 1026 shown in FIG. 10.

The base station or access point 1026 includes a processor 1017. The processor 1017 may be a general purpose single- or multi-chip microprocessor (e.g., an ARM), a special purpose microprocessor (e.g., a digital signal processor (DSP)), a microcontroller, a programmable gate array, etc. The processor 1017 may be referred to as a central processing unit (CPU). Although just a single processor 1017 is shown in the base station or access point 1026 of FIG. 10, in an alternative configuration, a combination of processors 1017 (e.g., an ARM and DSP) could be used.

The base station or access point 1026 also includes memory 1011 in electronic communication with the processor 1017 (i.e., the processor 1017 can read information from and/or write information to the memory 1011). The memory 1011 may be any electronic component capable of storing electronic information. The memory 1011 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1013 and instructions 1015 may be stored in the memory 1011. The instructions 1015 may include one or more programs, routines, sub-routines, functions, procedures, etc. The instructions 1015 may include a single computer-readable statement or many computer-readable statements. The instructions 1015 may be executable by the processor 1017 to implement the methods disclosed in connection with the communication device, base station or access point. Executing the instructions 1015 may involve the use of the data 1013 that is stored in the memory 1011. FIG. 10 shows some instructions 1015a and data 1013a being loaded into the processor 1017.

The base station or access point 1026 may also include a transmitter 1080 and a receiver 1060 to allow transmission and reception of signals between the base station or access point 1026 and a remote location (e.g., a wireless communication device 246 or access terminal). The transmitter 1080 and receiver 1060 may be collectively referred to as a transceiver 1009. An antenna 1012 may be electrically coupled to the transceiver 1009. The base station or access point 1026 may also include (not shown) multiple transmitters, multiple receivers, multiple transceivers and/or multiple antenna.

The various components of the base station or access point 1026 may be coupled together by one or more buses, which may include a power bus, a control signal bus, a status signal bus, a data bus, etc. For simplicity, the various buses are illustrated in FIG. 10 as a bus system 1019.

Figure 11:
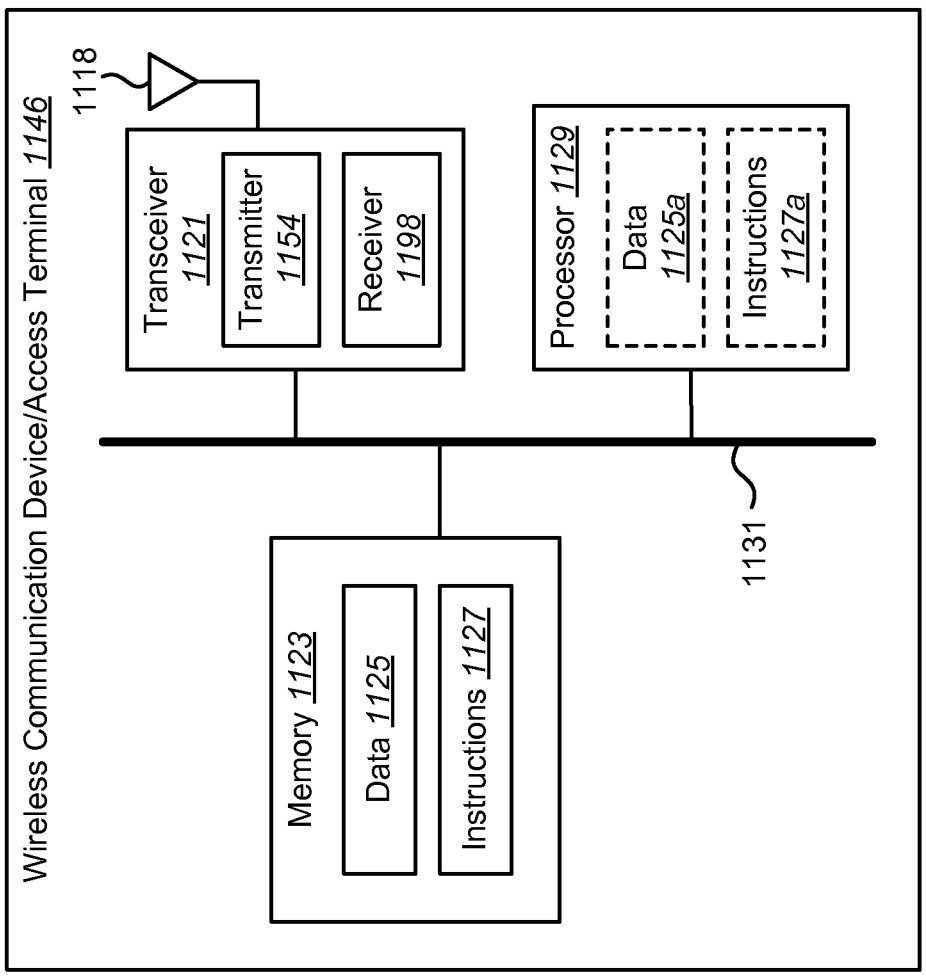
FIG. 11 illustrates certain components that may be included within a wireless communication device or access terminal.

FIG. 11 illustrates certain components that may be included within a wireless communication device or access terminal 1146. The wireless communication devices 246, 346 or communication devices 746, 946 discussed previously may be configured similarly to the wireless communication device or access terminal 1146 that is shown in FIG. 11.

The wireless communication device or access terminal 1146 includes a processor 1129. The processor 1129 may be a general purpose single- or multi-chip microprocessor (e.g., an ARM), a special purpose microprocessor (e.g., a digital signal processor (DSP)), a microcontroller, a programmable gate array, etc. The processor 1129 may be referred to as a central processing unit (CPU). Although just a single processor 1129 is shown in the wireless communication device or access terminal 1146 of FIG. 11, in an alternative configuration, a combination of processors (e.g., an ARM and DSP) could be used.

The wireless communication device or access terminal 1146 also includes memory 1123 in electronic communication with the processor 1129 (i.e., the processor 1129 can read information from and/or write information to the memory 1123). The memory 1123 may be any electronic component capable of storing electronic information. The memory 1123 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1125 and instructions 1127 may be stored in the memory 1123. The instructions 1127 may include one or more programs, routines, sub-routines, functions, procedures, etc. The instructions 1127 may include a single computer-readable statement or many computer-readable statements. The instructions 1127 may be executable by the processor 1129 to implement the methods that were described above in connection with the communication devices, wireless communication devices, or access terminals. Executing the instructions 1127 may involve the use of the data 1125 that is stored in the memory 1123. FIG. 11 shows some instructions 1127a and data 1125a being loaded into the processor 1129.

The wireless communication device or access terminal 1146 may also include a transmitter 1154 and a receiver 1198 to allow transmission and reception of signals between the wireless communication device or access terminal 1146 and a remote location (e.g., a base station 226 or access point). The transmitter 1154 and receiver 1198 may be collectively referred to as a transceiver 1121. An antenna 1118 may be electrically coupled to the transceiver 1121. The wireless communication device or access terminal 1146 may also include (not shown) multiple transmitters, multiple receivers, multiple transceivers and/or multiple antenna.

The various components of the wireless communication device or access terminal 1146 may be coupled together by one or more buses, which may include a power bus, a control signal bus, a status signal bus, a data bus, etc. For simplicity, the various buses are illustrated in FIG. 11 as a bus system 1131.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The terms "processor-readable medium" and "computer-readable medium" refer to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server or other remote source using a coaxial cable, fiber optic cable, twisted pair, digital subscriber line (DSL), or wireless technologies such as infrared, radio, and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A communication device for transmitting beamformed signals using implicit channel sounding, comprising:
    a processor;
    memory in electronic communication with the processor;
    instructions stored in the memory, the instructions being executable to:
        receive a first sounding signal with a first frequency offset from a first communication device and a second sounding signal with a second frequency offset from a second communication device;
        compute a channel estimate based on the first sounding signal and the second sounding signal;
        apply a first frequency shift and a second frequency shift to the channel estimate to produce a frequency offset compensated channel estimate, wherein the first frequency shift compensates for the first frequency offset and the second frequency shift compensates for the second frequency offset;
        compute a precoding matrix based on the frequency offset compensated channel estimate to produce a beamformed signal with reduced interference between a first signal for the first communication device and a second signal for the second communication device; and
        transmit the beamformed signal.

2. The communication device of claim 1, wherein the instructions are further executable to apply amplitude compensation to the channel estimate.

3. The communication device of claim 1, wherein the one or more sounding signals comprise one or more training packets.

4. The communication device of claim 1, wherein the beamformed signal is a Space Division Multiple Access (SDMA) signal.

5. The communication device of claim 1, wherein the communication device is selected from the group consisting of a base station, an access point, a wireless communication device and an access terminal.

6. The communication device of claim 1, wherein the sounding signals do not include explicit channel estimate information.

7. The communication device of claim 1, wherein the first and second communication devices are selected from the group consisting of one or more wireless communication devices, access terminals, base stations and access points.

8. The communication device of claim 1, further comprising one or more antennas.

9. The communication device of claim 1, wherein the communication device utilizes Orthogonal Frequency Division Multiplexing (OFDM).

10. The communication device of claim 1, wherein applying the first frequency shift to the channel estimate comprises:
    taking an Inverse Fast Fourier Transform (IFFT) of the channel estimate to produce a time-domain channel estimate;
    multiplying the time-domain channel estimate by a sample-shifted exponential function to produce a frequency offset compensated time-domain channel estimate; and
    taking a Fast Fourier Transform (FFT) of the frequency offset compensated time-domain channel estimate to produce a frequency offset compensated frequency domain channel estimate.

11. The communication device of claim 10, wherein applying the first frequency shift to the channel estimate further comprises applying a window function to the time-domain channel estimate.

12. A communication device for receiving beamformed signals using explicit channel sounding, comprising:
    a processor;
    memory in electronic communication with the processor;
    instructions stored in the memory, the instructions being executable to:
        compute a channel estimate based on one or more sounding signals;
        apply amplitude compensation to the channel estimate, wherein the amplitude compensation compensates for an effect of one or more receiver filters based on an inverse receiver filter response;
        send estimated channel data that is based on an amplitude compensated channel estimate; and
        receive a beam of a beamformed signal with reduced interference from another beam based on the estimated channel data.

13. The communication device of claim 12, wherein the one or more sounding signals comprises one or more training packets.

14. The communication device of claim 12, wherein the beamformed signal is a Space Division Multiple Access (SDMA) signal.

15. The communication device of claim 12, wherein the communication device is selected from the group consisting of a wireless communication device, an access terminal, a base station and an access point.

16. The communication device of claim 13, wherein the one or more training packets are received from another communication device.

17. The communication device of claim 16, wherein the other communication device is selected from the group consisting of a wireless communication device, an access terminal, a base station and an access point.

18. The communication device of claim 12, further comprising one or more antennas.

19. The communication device of claim 12, wherein the communication device utilizes Orthogonal Frequency Division Multiplexing (OFDM).

20. The communication device of claim 12, wherein the estimated channel data is sent to another communication device.

21. The communication device of claim 20, wherein the other communication device uses the estimated channel data to compute a precoding matrix and transmit a beamformed signal.

22. A method for transmitting beamformed signals from a communication device using implicit channel sounding, comprising:
receiving a first sounding signal with a first frequency offset from a first communication device and a second sounding signal with a second frequency offset from a second communication device;
computing a channel estimate based on the first sounding signal and the second sounding signal;
applying, by the communication device, a first frequency shift and a second frequency shift to the channel estimate to produce a frequency offset compensated channel estimate, wherein the first frequency shift compensates for the first frequency offset and the second frequency shift compensates for the second frequency offset;
computing a precoding matrix based on the frequency offset compensated channel estimate to produce a beamformed signal with reduced interference between a first signal for the first communication device and a second signal for the second communication device; and
transmitting the beamformed signal.

23. The method of claim 22, further comprising, applying amplitude compensation to the channel estimate.

24. The method of claim 22, wherein the one or more sounding signals comprise one or more training packets.

25. The method of claim 22, wherein the beamformed signal is a Space Division Multiple Access (SDMA) signal.

26. The method of claim 22, wherein the communication device is selected from the group consisting of a base station, an access point, a wireless communication device and an access terminal.

27. The method of claim 22, wherein the sounding signals do not include explicit channel estimate information.

28. The method of claim 22, wherein the first and second communication devices are selected from the group consisting of one or more wireless communication devices, access terminals, base stations and access points.

29. The method of claim 22, wherein the communication device comprises one or more antennas.

30. The method of claim 22, wherein the communication device utilizes Orthogonal Frequency Division Multiplexing (OFDM).

31. The method of claim 22, wherein applying the first frequency shift to the channel estimate comprises:
taking an Inverse Fast Fourier Transform (IFFT) of the channel estimate to produce a time-domain channel estimate;
multiplying the time-domain channel estimate by a sample-shifted exponential function to produce a frequency offset compensated time-domain channel estimate; and
taking a Fast Fourier Transform (FFT) of the frequency offset compensated time-domain channel estimate to produce a frequency offset compensated frequency domain channel estimate.

32. The method of claim 31, wherein applying the first frequency shift to the channel estimate further comprises applying a window function to the time-domain channel estimate.

33. A method for receiving beamformed signals using explicit channel sounding, comprising:
computing, by a communication device, a channel estimate based on one or more sounding signals;
applying, by the communication device, amplitude compensation to the channel estimate, wherein the amplitude compensation compensates for an effect of one or more receiver filters based on an inverse receiver filter response;
sending, from the communication device, estimated channel data that is based on an amplitude compensated channel estimate; and
receiving, by the communication device, a beam of a beamformed signal with reduced interference from another beam based on the estimated channel data.

34. The method of claim 33, wherein the one or more sounding signals comprises one or more training packets.

35. The method of claim 33, wherein the beamformed signal is a Space Division Multiple Access (SDMA) signal.

36. The method of claim 33, wherein the communication device is selected from the group consisting of a wireless communication device, an access terminal, a base station and an access point.

37. The method of claim 34, wherein the one or more training packets are received from another communication device.

38. The method of claim 37, wherein the other communication device is selected from the group consisting of a wireless communication device, an access terminal, a base station and an access point.

39. The method of claim 33, wherein the communication device comprises one or more antennas.

40. The method of claim 33, wherein the communication device utilizes Orthogonal Frequency Division Multiplexing (OFDM).

41. The method of claim 33, wherein the estimated channel data is sent to another communication device.

42. The method of claim 41, wherein the other communication device uses the estimated channel data to compute a precoding matrix and transmit a beamformed signal.

43. A computer-program product for transmitting beamformed signals using implicit channel sounding, the computer-program product comprising a non-transitory tangible computer-readable medium having instructions thereon, the instructions comprising:
code for receiving a first sounding signal with a first frequency offset from a first communication device and a second sounding signal with a second frequency offset from a second communication device;
code for computing a channel estimate based on the first sounding signal and the second sounding signal;
code for applying a first frequency shift and a second frequency shift to the channel estimate to produce a frequency offset compensated channel estimate, wherein the first frequency shift compensates for the first frequency offset and the second frequency shift compensates for the second frequency offset;
code for computing a precoding matrix based on the frequency offset compensated channel estimate to produce a beamformed signal with reduced interference between a first signal for the first communication device and a second signal for the second communication device; and
code for transmitting the beamformed signal.

44. The computer-program product of claim 43, wherein the instructions further comprise code for applying amplitude compensation to the channel estimate.

45. The computer-program product of claim 43, wherein applying the first frequency shift to the channel estimate comprises:
  taking an Inverse Fast Fourier Transform (IFFT) of the channel estimate to produce a time-domain channel estimate;
  multiplying the time-domain channel estimate by a sample-shifted exponential function to produce a frequency offset compensated time-domain channel estimate; and
  taking a Fast Fourier Transform (FFT) of the frequency offset compensated time-domain channel estimate to produce a frequency offset compensated frequency domain channel estimate.

46. A computer-program product for receiving beamformed signals using explicit channel sounding, the computer-program product comprising a non-transitory tangible computer-readable medium having instructions thereon, the instructions comprising:
  code for computing a channel estimate based on one or more sounding signals;
  code for applying amplitude compensation to the channel estimate, wherein the amplitude compensation compensates for an effect of one or more receiver filters based on an inverse receiver filter response;
  code for sending estimated channel data that is based on an amplitude compensated channel estimate; and
  code for receiving a beam of a beamformed signal with reduced interference from another beam based on the estimated channel data.

47. The computer-program product of claim 46, wherein another communication device uses the estimated channel data to compute a precoding matrix and transmit a beamformed signal.

48. An apparatus for transmitting beamformed signals using implicit channel sounding, comprising:
  means for causing a communication device to receive a first sounding signal with a first frequency offset from a first communication device and a second sounding signal with a second frequency offset from a second communication device;
  means for causing the communication device to compute a channel estimate based on the first sounding signal and the second sounding signal;
  means for causing the communication device to apply a first frequency shift and a second frequency shift to the channel estimate to produce a frequency offset compensated channel estimate, wherein the first frequency shift compensates for the first frequency offset and the second frequency shift compensates for the second frequency offset;
  means for causing the communication device to compute a precoding matrix based on the frequency offset compensated channel estimate to produce a beamformed signal with reduced interference between a first signal for the first communication device and a second signal for the second communication device; and
  means for causing the communication device to transmit the beamformed signal.

49. An apparatus for receiving beamformed signals using explicit channel sounding, comprising:
  means for causing a communication device to compute a channel estimate based on one or more sounding signals;
  means for causing the communication device to apply amplitude compensation to the channel estimate, wherein the amplitude compensation compensates for an effect of one or more receiver filters based on an inverse receiver filter response;
  means for causing the communication device to send estimated channel data that is based on an amplitude compensated channel estimate; and
  means for causing the communication device to receive a beam of a beamformed signal with reduced interference from another beam based on the estimated channel data.

* * * * *